United States Patent
Sommer et al.

(10) Patent No.: US 12,255,519 B1
(45) Date of Patent: Mar. 18, 2025

(54) SYSTEMS AND METHODS FOR ELECTRICAL POWER GENERATION

(71) Applicant: Cameron International Corporation, Houston, TX (US)

(72) Inventors: Burkhard Sommer, Houston, TX (US); Pierre Petit, Katy, TX (US); Edmund Peter McHugh, Longford (IE); Michael Mullin, Longford (IE); Conor Gray, Longford (IE); Martin Fleet, Cornwall (GB); Michael Anthony McKeon, Longford (IE); Gustavo Gonzalez, Cypress, TX (US); Phillip Theriot, Houston, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 18/390,232

(22) Filed: Dec. 20, 2023

(51) Int. Cl.
*H02K 7/18* (2006.01)
*H02J 7/00* (2006.01)
*H02J 7/14* (2006.01)

(52) U.S. Cl.
CPC .......... *H02K 7/1823* (2013.01); *H02J 7/0013* (2013.01); *H02J 7/1423* (2013.01)

(58) Field of Classification Search
CPC ..... H02K 7/1823; H02J 7/0013; H02J 7/1423
See application file for complete search history.

(56) References Cited

U.S. PATENT DOCUMENTS

| 8,779,614 | B2 | 7/2014 | Yarnold | |
|---|---|---|---|---|
| 8,893,499 | B2 | 11/2014 | Maier | |
| 2008/0231056 | A1* | 9/2008 | Wen | F03B 13/00 290/54 |
| 2019/0115758 | A1* | 4/2019 | Orban | E21B 3/022 |
| 2021/0277749 | A1* | 9/2021 | Alhuraifi | E21B 49/08 |
| 2022/0178340 | A1* | 6/2022 | Cotrell | F03D 9/28 |
| 2023/0313784 | A1* | 10/2023 | Alsubaity | F03G 6/067 60/641.8 |

FOREIGN PATENT DOCUMENTS

WO 2017141027 A1 8/2017

* cited by examiner

*Primary Examiner* — Viet P Nguyen
(74) *Attorney, Agent, or Firm* — Jeffrey D. Frantz

(57) ABSTRACT

A generator unit of a system for generating electrical power includes a generator coupled to a turbine. A flowline coupled to the generator unit conveys a fluid to an inlet of the turbine. A second flowline couples an outlet of the turbine and a tree of a well at a wellsite. The second flowline conveys the fluid from the outlet to the tree.

18 Claims, 17 Drawing Sheets

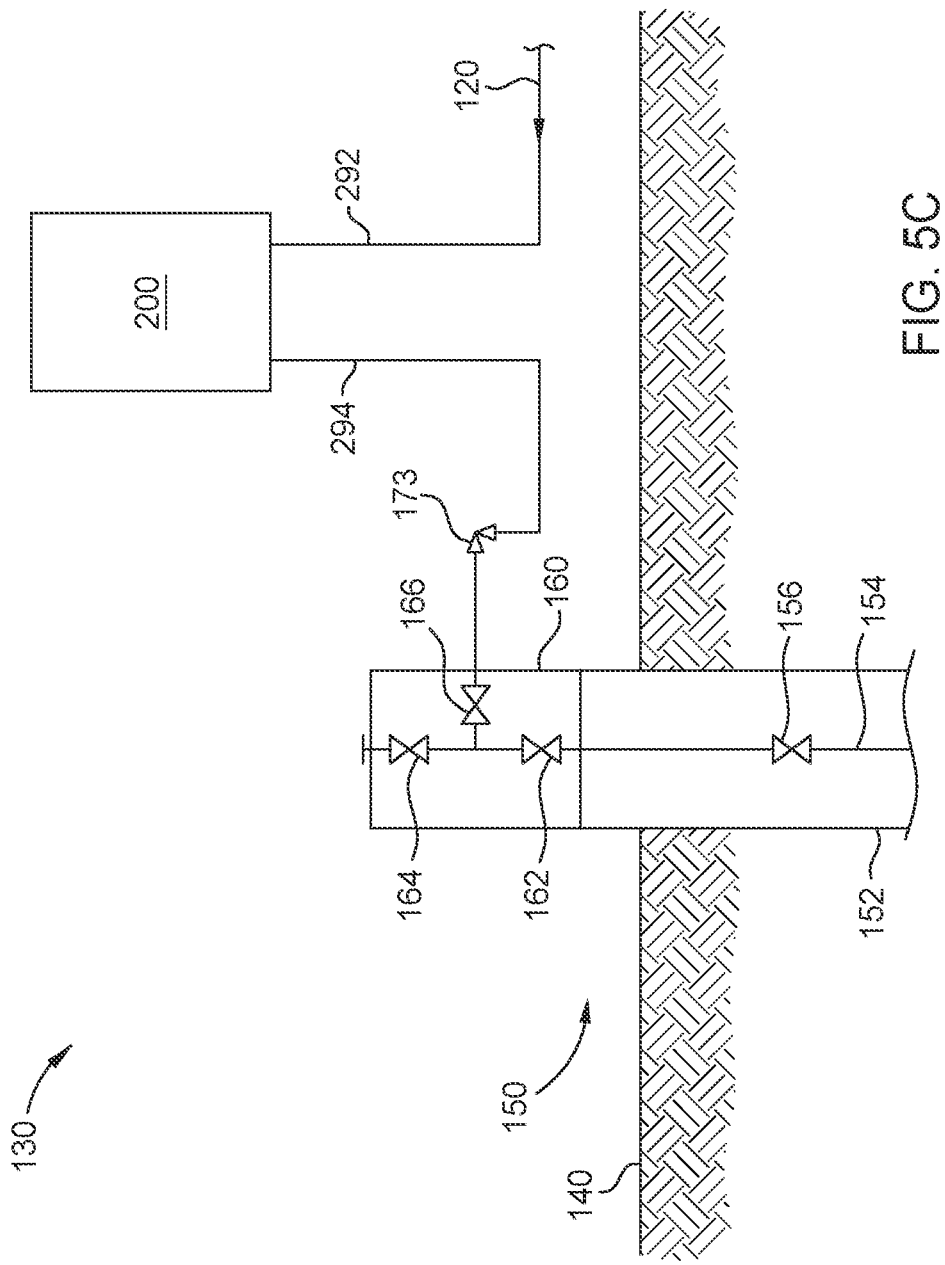

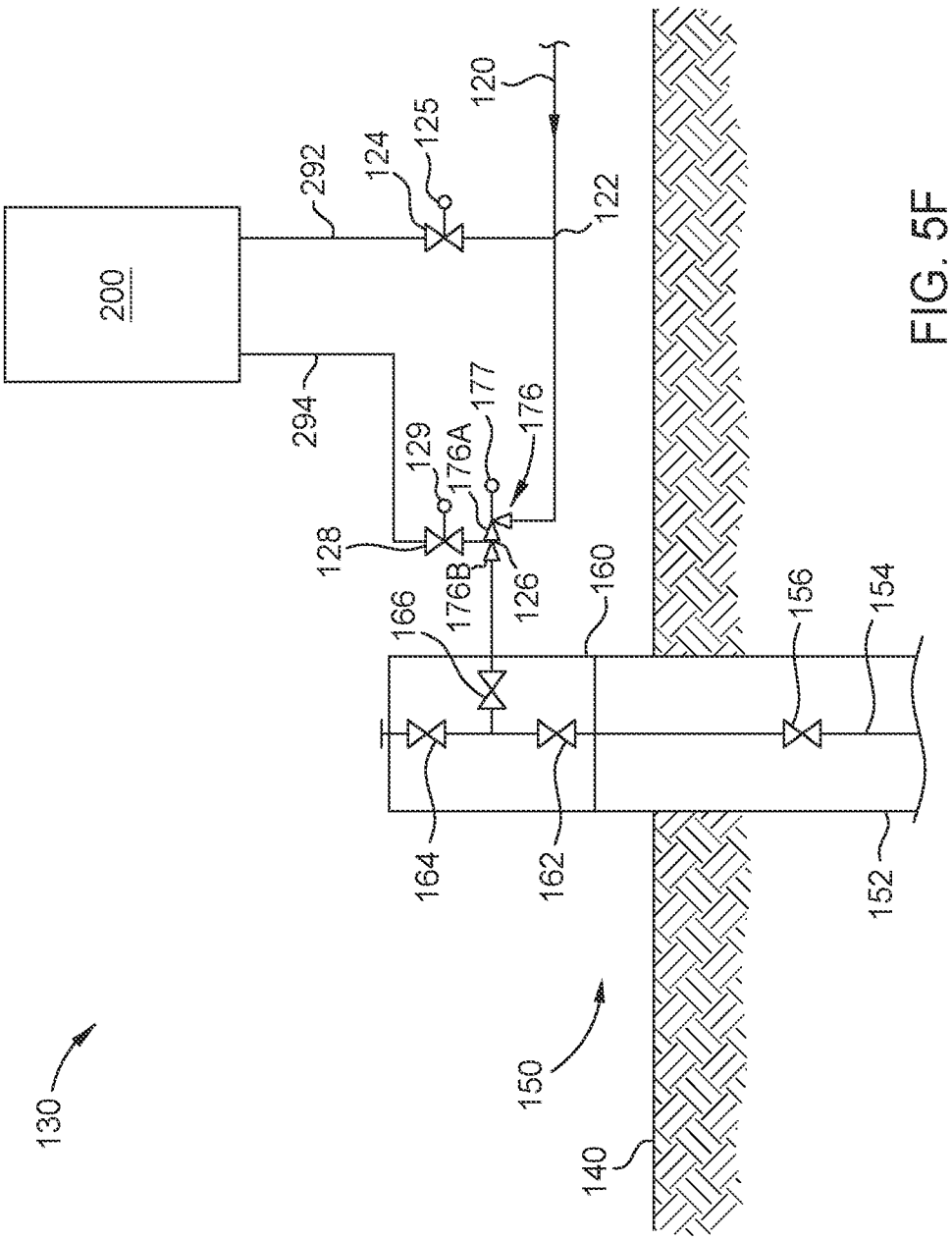

SYSTEMS AND METHODS FOR ELECTRICAL POWER GENERATION

BACKGROUND

Some systems for carbon capture, utilization, and sequestration rely on wells to convey carbon dioxide into a subterranean formation. Some of the suitable geological horizons and subterranean formations are remote from existing infrastructure, and therefore the wells can be located hundreds of kilometers from existing infrastructure. Some of the well locations are offshore, and the wells are subsea wells.

Power is required at the wellsites to operate equipment, such as sensors and valves associated with the wells. The provision of power to a remote subsea well typically requires the installation of a subsea electrical umbilical that extends from the well back to existing infrastructure. Thus, the electrical umbilical can be hundreds of kilometers long, which is costly. Wells used for carbon dioxide injection are anticipated to have a life of about twenty-five years, or even greater. During this time, it is necessary to perform periodic inspection, maintenance, and (possibly) repair of the electrical umbilical, which incurs more cost and can be logistically complex.

There is a need for systems, apparatus, and methods to provide power at remote well locations without the cost and complexities associated with providing and maintaining an electrical umbilical.

SUMMARY

Aspects of the present disclosure provide systems, apparatus, and methods for generating electricity using a flow of a fluid. In one aspect, a system for generating electrical power at a wellsite includes a generator unit. The generator unit includes a base and a power generation module removably coupled to the base. The power generation module includes a generator coupled to a turbine. A first flowline is coupled to the generator unit and is configured to convey a fluid to an inlet of the turbine. A second flowline is coupled to the generator unit and is configured to convey a fluid from an outlet of the turbine.

In another aspect, a system for generating electrical power includes a first base. The first base includes first and second conduits. A first power generation module is coupled to the first base. The first power generation module includes a first turbine coupled to a first generator. The first conduit is coupled to an inlet of the turbine, and the second conduit is coupled to an outlet of the turbine. A choke is coupled to the inlet or the outlet.

In another aspect, a method of generating electrical power includes flowing a fluid in a first flowline and flowing at least a first portion of the fluid through a turbine. The method includes operating the turbine using the first portion of the fluid to power a generator coupled to first and second batteries. The method includes using electricity generated by the generator to charge the first battery while operating an item of electrical equipment using the second battery.

The following description and the appended figures set forth certain features for purposes of illustration.

BRIEF DESCRIPTION OF DRAWINGS

The appended figures illustrate only exemplary embodiments and are therefore not to be considered limiting of the scope of the disclosure, as the disclosure may admit to other equally effective embodiments.

FIGS. 5A to 5G schematically illustrate examples of the configurations of FIGS. 4A to 4D coupled to a well.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Aspects of the present disclosure provide systems, apparatus, and methods for generating electricity using a flow of a fluid. In some embodiments, the fluid is, or includes, at least one of water, a hydrocarbon, or carbon dioxide. In some embodiments, the fluid is used to generate electricity prior to injection of the fluid into a well. In some embodiments, the well is a production well. In some embodiments, the well is an injection well. In some embodiments, the fluid is used to generate electricity at a wellsite at which the well is located. In some embodiments, the wellsite is remote from other sources of electrical power. In some embodiments, the fluid is used to generate electricity at a manifold. In some examples, the manifold is at a wellsite. In some examples, the manifold is not at a wellsite.

Figure 1:
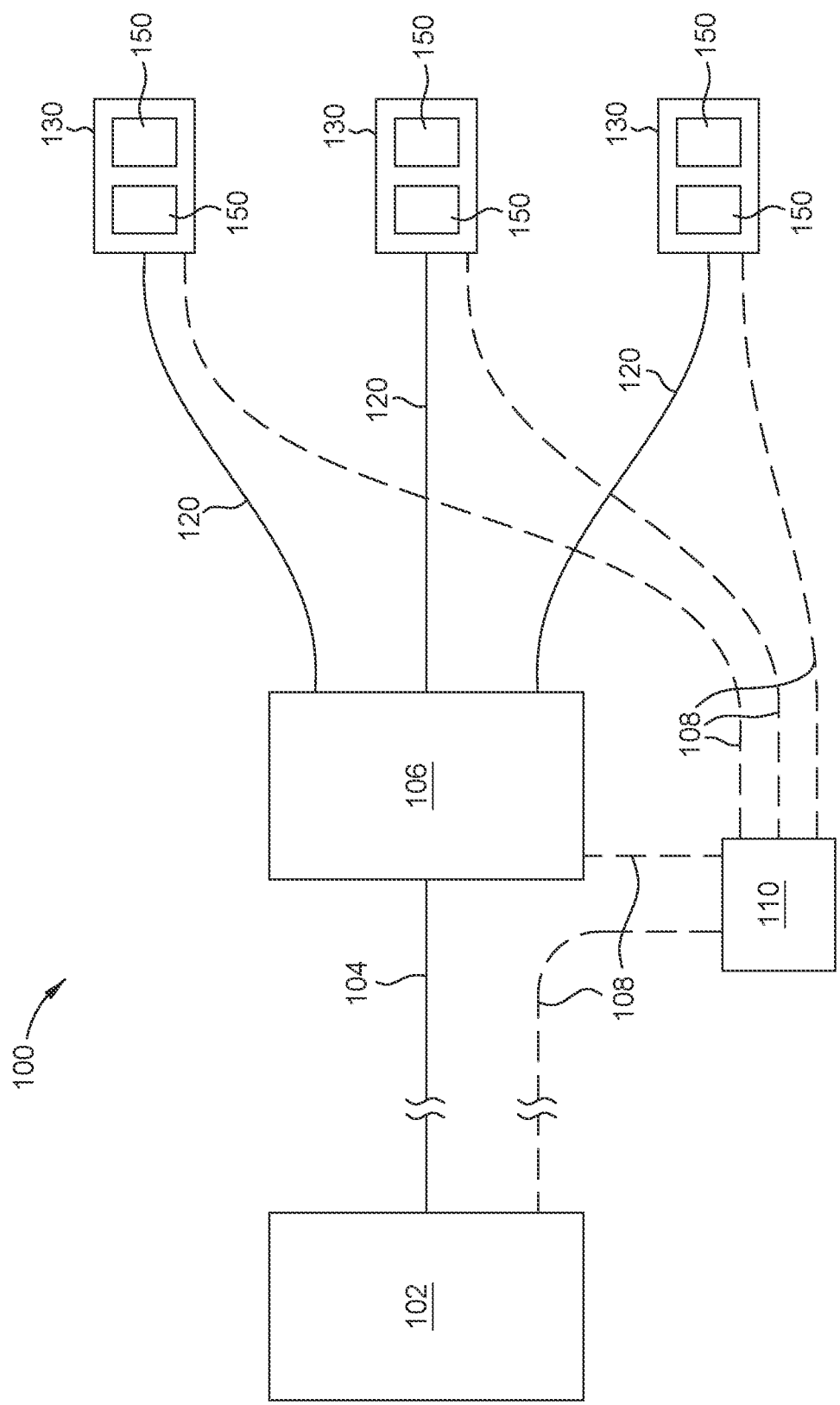
FIG. 1 schematically illustrates a fluid injection system.

FIG. 1 schematically illustrates a fluid injection system 100. A pipeline 104 conveys the fluid from a source 102 of the fluid (such as a reservoir, storage tank, or processing plant) to a distribution manifold 106. In some embodiments, the distribution manifold 106 is remote from the fluid source 102, such that the length of the pipeline 104 is 50 km or greater, 100 km or greater, 200 km or greater, or 500 km or greater. The distribution manifold 106 routes the fluid to one or more wellsites 130 through corresponding injection flowlines 120. One or more wells 150 are located at each wellsite 130. In some embodiments, the one or more wells 150 are production wells. In some embodiments, the one or more wells 150 are injection wells.

In some embodiments, the fluid is, or includes, a pressurized fluid that is injected into the one or more wells 150 for placement in a subterranean formation (not shown). In some embodiments, the pressurized fluid is, or includes, at least one of water, a hydrocarbon, or carbon dioxide. In an example, the fluid injection system 100 is used in a carbon capture, utilization, and sequestration operation. In some embodiments, the pressurized fluid is, or includes, a treatment fluid that is injected into the one or more wells 150. In some embodiments, the treatment fluid is, or includes, water, a corrosion inhibitor, a hydrate inhibitor (such as a glycol), a wax inhibitor, a sulfide scavenger, or the like. In some embodiments, the fluid is injected into a tubing string in the one or more wells 150. In some embodiments, the fluid is injected into an annulus surrounding the tubing string in the one or more wells 150.

In some embodiments, the distribution manifold 106 is located on land. In some embodiments, the distribution manifold 106 is located offshore. In some embodiments, the distribution manifold 106 is located subsea. In some embodiments, the one or more wellsites 130 are located on land. In some embodiments, the one or more wellsites 130 are located offshore. In some embodiments, the one or more wellsites 130 are located subsea.

A controller 110 at the distribution manifold 106 monitors and controls the operations of the distribution manifold 106. In some embodiments, the controller 110 monitors and controls the operations at the one or more wellsites 130. The controller 110 includes a central processing unit (CPU), a memory containing instructions, and support circuits for the CPU. The memory, or non-transitory computer readable medium, is one or more of a readily available memory such as random access memory (RAM), read only memory (ROM), hard disk, flash drive, or any other form of digital storage, local or remote. The support circuits are coupled to the CPU for supporting the CPU. The support circuits include cache, power supplies, clock circuits, input/output circuitry and subsystems, and the like. Operations and operating parameters are stored in the memory as a software routine that is executed or invoked to configure the controller 110 into a specific purpose controller to control selected operations of the fluid injection system 100. The instructions stored on the memory, when executed by the controller 110, cause one or more of the operations of the fluid injection system 100 to be conducted. In an example, the instructions, when executed by the controller 110, cause one or more of the operations of the distribution manifold 106 to be conducted.

The controller 110 communicates with sensors (such as pressure, temperature, or flowrate sensors at the distribution manifold 106), actuators (such as actuators for valves at the distribution manifold 106), the fluid source 102, the wellsites 130, and/or other devices or controllers of the fluid injection system 100 via one or more communication links 108. Each communication link 108 may include wired telemetry (such as via an electric line or a fiber optic line), or wireless telemetry (such as radio or acoustic telemetry). In some examples, radio telemetry may be used in a land-based operation, or in an offshore operation in which the controller 110 is coupled to a floating buoy that has an aerial. In some examples, acoustic telemetry may be used in a subsea environment.

Figure 2:
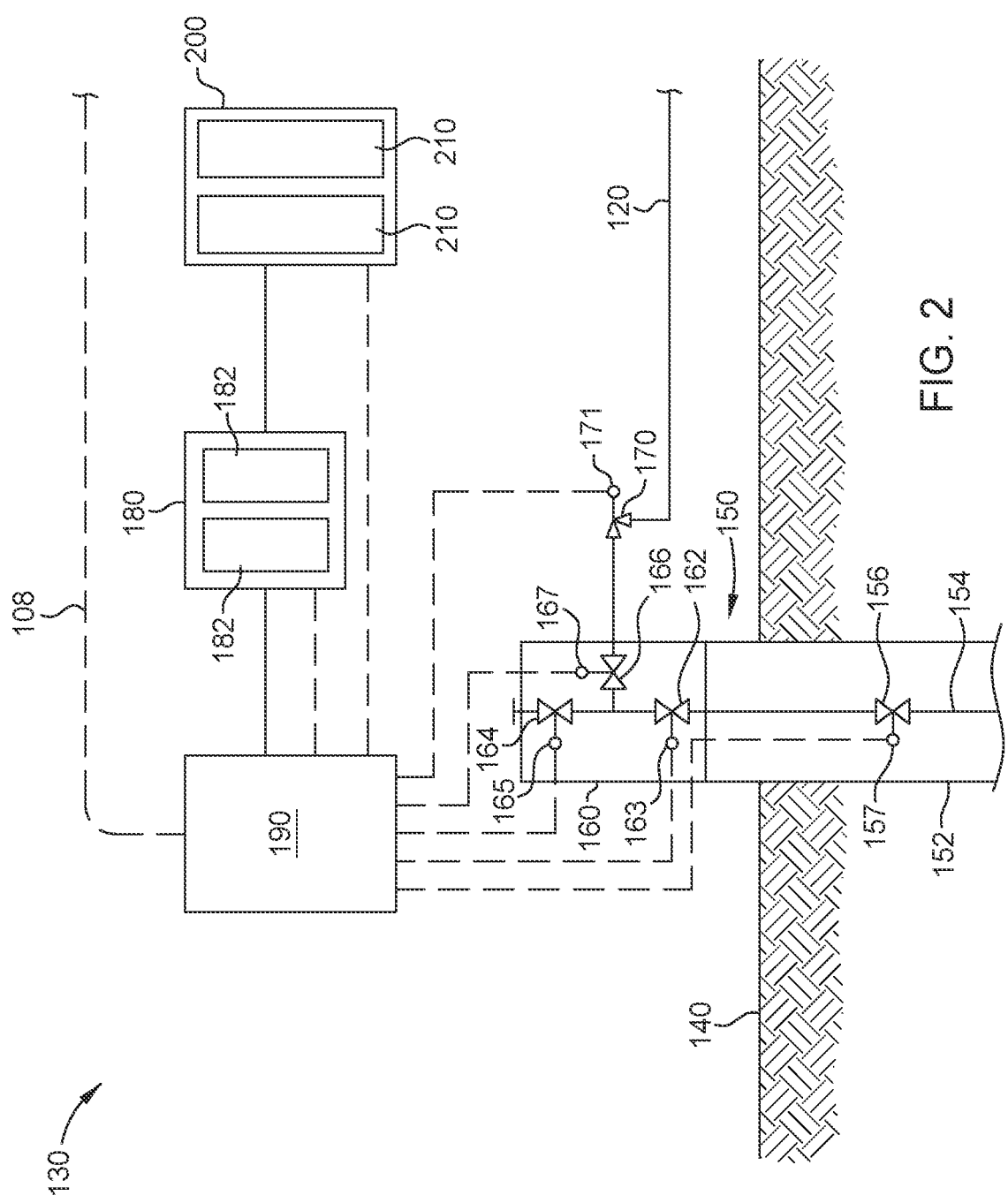
FIG. 2 schematically illustrates a wellsite of the fluid injection system of FIG. 1.

FIG. 2 schematically illustrates a wellsite 130 of the fluid injection system 100 of FIG. 1. In the example shown, the wellsite 130 is subsea. A well 150 at the wellsite 130 penetrates the seabed 140. In other examples, the wellsite 130 may be on land, and the well 150 penetrates the ground surface. For clarity, only one well 150 is depicted. In some embodiments, two, three, or more wells 150 may be located at the wellsite 130. The well 150 includes a wellbore 152. A tubing string 154 in the wellbore 152 routes the fluid to the subterranean formation. A subsurface safety valve 156 in the tubing string 154 is normally in an open position to permit the fluid to flow through the tubing string 154. The subsurface safety valve 156 in the tubing string 154 is operated by an actuator 157. In some embodiments, the actuator 157 is an electrically-powered actuator.

The well 150 includes a tree 160 coupled to the wellbore 152. The tree 160 includes a master valve 162, a swab valve 164, and a wing valve 166. In some embodiments, the tree 160 includes additional valves, such as valves that facilitate fluidic access to an annulus around the tubing string 154 in the wellbore 152. The master valve 162 is operated by an actuator 163. In some embodiments, the actuator 163 is an electrically-powered actuator. The swab valve 164 is operated by an actuator 165. In some embodiments, the actuator 165 is an electrically-powered actuator. The wing valve 166 is operated by an actuator 167. In some embodiments, the actuator 167 is an electrically-powered actuator.

The injection flowline 120 is coupled to the tree 160. In some embodiments, the injection flowline 120 is coupled to the tree 160 via a local injection manifold. As illustrated, in some embodiments, an injection choke 170 couples the injection flowline 120 to the tree 160. In some embodiments, the injection choke 170 is a variable choke operated by an actuator 171. In some embodiments, the actuator 171 is an electrically-powered actuator. In some embodiments, the injection choke 170 is a fixed choke. The fluid flows through the injection flowline 120, through the injection choke 170 to the tree 160. In the depicted example, the injection flowline 120 is coupled to the tree 160 upstream of the wing valve 166. During injection of the fluid into the well 150, the swab valve 164 is closed, whereas the wing valve 166 and the master valve 162 are open. The fluid flows through the wing valve 166 and the master valve 162, and into the tubing string 154. In another example, the injection flowline 120 is coupled to the tree 160 upstream of an annular wing valve and/or an annular master valve.

A local controller 190 controls operation of the components at the wellsite 130, such as chokes, valves, sensors, signaling systems, communication systems, control systems, etc. In some embodiments, the local controller 190 is configured similarly to the controller 110. The local controller 190 communicates with the controller 110 via the communication link 108. An energy storage, such as battery pack 180 provides power for operating all the components at the wellsite 130, such as all valves, sensors, signaling systems, communication systems, control systems, etc. The battery pack 180 includes one or more batteries 182, such as lithium-ion batteries. In some embodiments, the one or more batteries 182 are replaceable. In some embodiments, the one or more batteries 182 are rechargeable. In the illustrated example, the one or more batteries 182 are recharged by a local electricity generator 200. The local electricity generator 200 includes one or more generator units 210; each generator unit 210 is configured to generate electricity. In some embodiments, each generator unit 210 is configured to generate electricity from one of solar energy, wind energy, wave energy, ocean current/tidal energy, or a flow of a fluid in the fluid injection system 100. The local controller 190 controls operation of the local electricity generator 200.

Figure 3A:
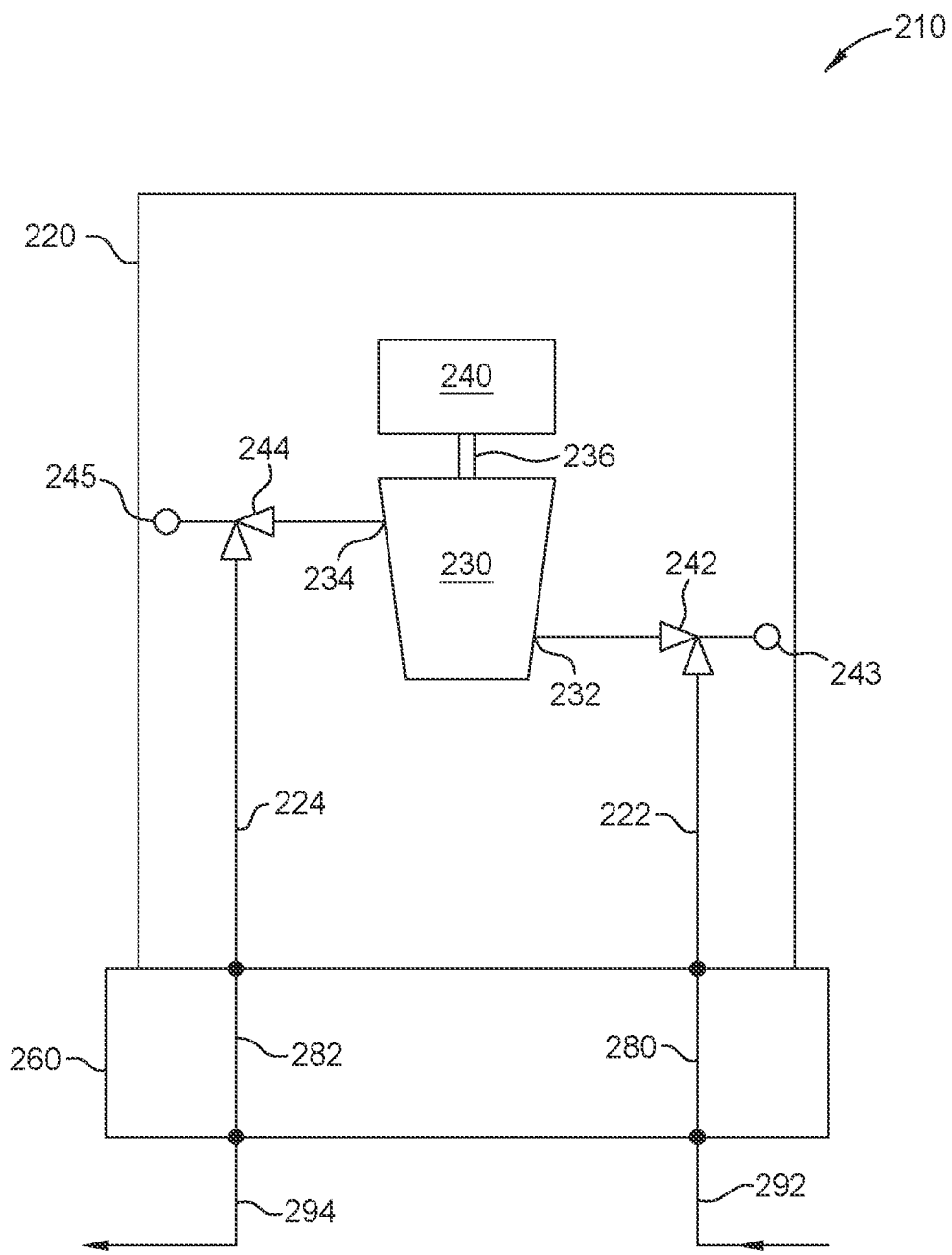
FIGS. 3A to 3C schematically illustrate exemplary configurations of power generation apparatus for use with the fluid injection system of FIG. 1.
Figure 3B:
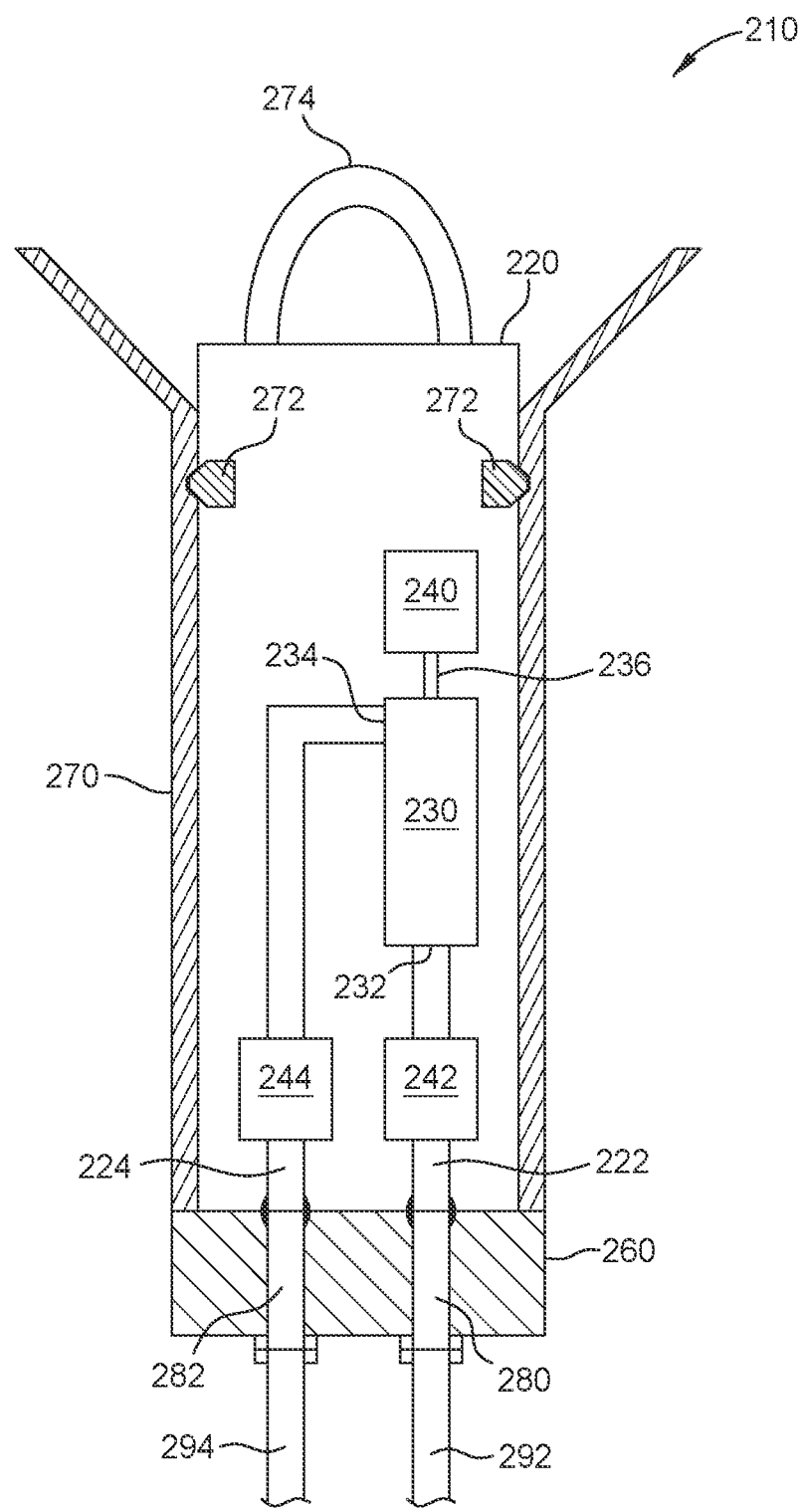

FIGS. 3A and 3B schematically illustrate an exemplary generator unit 210 of the local electricity generator 200. The generator unit 210 is configured to generate electricity from a flow of a fluid in the fluid injection system 100. The generator unit 210 includes a power generation module 220 coupled to a base 260. In some embodiments, the power generation module 220 is integral with the base 260. In some embodiments, the power generation module 220 is permanently coupled to the base 260. In some embodiments, the power generation module 220 is removably coupled to the base 260 by a fastener, such as a latch, C-ring, locking dogs, or the like. As shown in FIG. 3B, in some embodiments, the base 260 includes, or is coupled to, a receptacle 270 (such as a canister, a shaped tray, or the like), and the fastener 272 of the power generation module 220 releasably engages the receptacle 270. In the depicted example, a handle 274 facilitates installation and removal of the power generation module 220 onto/from the base 260.

The power generation module 220 houses a turbine 230 coupled to a generator 240 that generates electricity. In an example, the generator 240 is an alternator. In some embodiments, the generator 240 is a DC generator. In some embodiments, the generator 240 is a single-phase AC generator. In some embodiments, the generator 240 is a three-phase AC generator. Fluid flows through an entry conduit 222, and into the turbine 230 at an inlet 232. The fluid flows through the turbine 230, causing rotation of a shaft 236 which operates the generator 240 to generate electricity. The fluid flows out of the turbine 230 at an outlet 234, and through an exit conduit 224. In some embodiments, a choke 242, such as a control valve, is coupled to the inlet 232. In an example, the choke 242 regulates at least one of fluid flow into the turbine 230 or a pressure of the fluid at the inlet 232 of the turbine 230. As illustrated, in some embodiments, the choke 242 is a variable choke that is operated by an actuator 243. In some embodiments, the actuator 243 is an electrically-powered actuator. In some embodiments, the choke 242 is a fixed choke. In some embodiments, the choke 242 may be omitted.

In some embodiments, a choke 244, such as a control valve, is coupled to the outlet 234. In an example, the choke 244 regulates at least one of fluid flow out of the turbine 230, a pressure of the fluid at the outlet 234 of the turbine 230, or a pressure of the fluid downstream of the turbine 230. As illustrated, in some embodiments, the choke 244 is a variable choke that is operated by an actuator 245. In some embodiments, the actuator 245 is an electrically-powered actuator. In some embodiments, the choke 244 is a fixed choke. In some embodiments, the choke 244 may be omitted.

In some embodiments, the power generation module 220 includes both choke 242 and choke 244. In some embodiments, both choke 242 and choke 244 are omitted. In some embodiments, the power generation module 220 includes choke 242, but choke 244 is omitted. In some embodiments, the power generation module 220 includes choke 244, but choke 242 is omitted.

In some embodiments, operation of the choke 242 and/or the choke 244 is controlled to regulate a phase or state of the fluid in the power generation module 220. In an example, operation of the choke 242 and/or the choke 244 is controlled such that the fluid is in a supercritical state when entering the power generation module 220, remains in the supercritical state while flowing through the power generation module 220, and is in the supercritical state upon exiting the power generation module 220. In another example, operation of the choke 242 and/or the choke 244 is controlled such that the fluid is in a supercritical state when entering the power generation module 220 and is not in a supercritical state upon exiting the power generation module 220. In such an example, the fluid may exist in a liquid phase or in a gas phase upon exiting the power generation module 220.

In some embodiments, operation of the choke 242 and/or the choke 244 is controlled to regulate cooling of the fluid (e.g. due to the Joule-Thompson effect and/or vaporization) during passage of the fluid through the power generation module 220, such as at the inlet 232 of the turbine 230, within the turbine 230, or downstream of the turbine 230. In some embodiments, operation of the choke 242 and/or the choke 244 is controlled to regulate a density of the fluid during passage of the fluid through the power generation module 220, such as at the inlet 232 of the turbine 230, within the turbine 230, or downstream of the turbine 230.

The base 260 includes an input conduit 280 coupled to the entry conduit 222 of the power generation module 220. An input flowline 292 is coupled to the input conduit 280 of the base 260. In some embodiments, the input flowline 292 is a portion of the injection flowline 120. In some embodiments, the input flowline 292 is coupled to the injection flowline 120, such as via a local manifold, a tee, or other branch. The fluid from the input flowline 292 is conveyed to the inlet 232 of the turbine 230 of the generator unit 210 through the input conduit 280 and the entry conduit 222. An output flowline 294 is coupled to an output conduit 282 of the base 260. In some embodiments, the output flowline 294 is a portion of the injection flowline 120. In some embodiments, the output flowline 294 is coupled to the injection flowline 120, such as via a local manifold, a tee, or other branch. In some embodiments, the output flowline 294 is coupled to the tree 160 of the well 150. The fluid from the outlet 234 of the turbine 230 of the generator unit 210 is conveyed to the output flowline 294 through the exit conduit 224 and the output conduit 282.

In some embodiments, the choke 242 is omitted from the power generation module 220 but is disposed between the input flowline 292 and the input conduit 280 of the base 260. In some embodiments, the choke 242 is omitted from the power generation module 220, but is disposed in the base 260, coupled between the input flowline 292 and the entry conduit 222 of the power generation module 220. In some embodiments, the choke 244 is omitted from the power generation module 220 but is disposed between the output flowline 294 and the output conduit 282 of the base 260. In some embodiments, the choke 244 is omitted from the power generation module 220, but is disposed in the base 260, coupled between the exit conduit 224 of the power generation module 220 and the output flowline 294.

In some embodiments, the input flowline 292 may be sized to regulate a flowrate of the fluid through the turbine 230. In an example, the input flowline 292 may have a nominal diameter of about 2 inches (about 5 cm). In some embodiments, the output flowline 294 may be sized to regulate a flowrate of the fluid through the turbine 230. In an example, the output flowline 294 may have a nominal diameter of about 2 inches (about 5 cm).

In some embodiments, the generator unit 210 is operated to recharge a battery 182 (FIG. 2) whose charge level has been drained to 90%, 80%, 70%, 60%, 50%, 40%, 30%, 20%, 10%, or less. In some embodiments, two or more generator units 210 together are operated to recharge a battery 182 whose charge level has been drained to 90%, 80%, 70%, 60%, 50%, 40%, 30%, 20%, 10%, or less. In some embodiments, the generator unit 210 is operated to apply a trickle charge to a battery 182. In some embodiments, two or more generator units 210 together are operated to apply a trickle charge to a battery 182. In some embodiments, the turbine 230 of the generator unit 210 is operated continuously while the fluid is flowing to the well 150.

In some embodiments, the generator 240 may be temporarily disconnected from the turbine 230 such that the turbine 230 does not operate the generator 240. In an example, a clutch rotationally disconnects the shaft 236 from one of the turbine 230 or the generator 240. The generator 240 may be disconnected from the turbine 230 (such as via the clutch) in response to one or more batteries 182 of the battery pack 180 (FIG. 2) being charged up to, or beyond, a selected threshold level, such as 90%, 95%, 97%, 98%, 99%, or 100%. The generator 240 may be reconnected to the turbine 230 (such as via the clutch) in response to the charge of one or more batteries 182 of the battery pack 180 falling to, or beyond, a selected threshold level, such as 95%, 90%, 85%, 80%, 75%, 70%, 65%, 60%, 55%, 50%, or less. In some embodiments, the turbine 230 becomes free-spinning when disconnected from the generator 240.

In some embodiments, the generator 240 may be temporarily disconnected from one or more batteries 182 of the battery pack 180 (such as by a switch) in response to the one or more batteries 182 being charged up to, or beyond, a selected threshold level, such as 90%, 95%, 97%, 98%, 99%, or 100%. The generator 240 may be reconnected to the one or more batteries 182 (such as via the switch) in response to the charge of the one or more batteries 182 falling to, or beyond, a selected threshold level, such as 95%, 90%, 85%, 80%, 75%, 70%, 65%, 60%, 55%, 50%, or less.

In some embodiments, the turbine 230 is used as a flowmeter to monitor the amount of fluid flowing through the generator unit 210. In some embodiments, data from the turbine 230 related to a flowrate of the fluid is transmitted to the local controller 190.

Figure 3C:
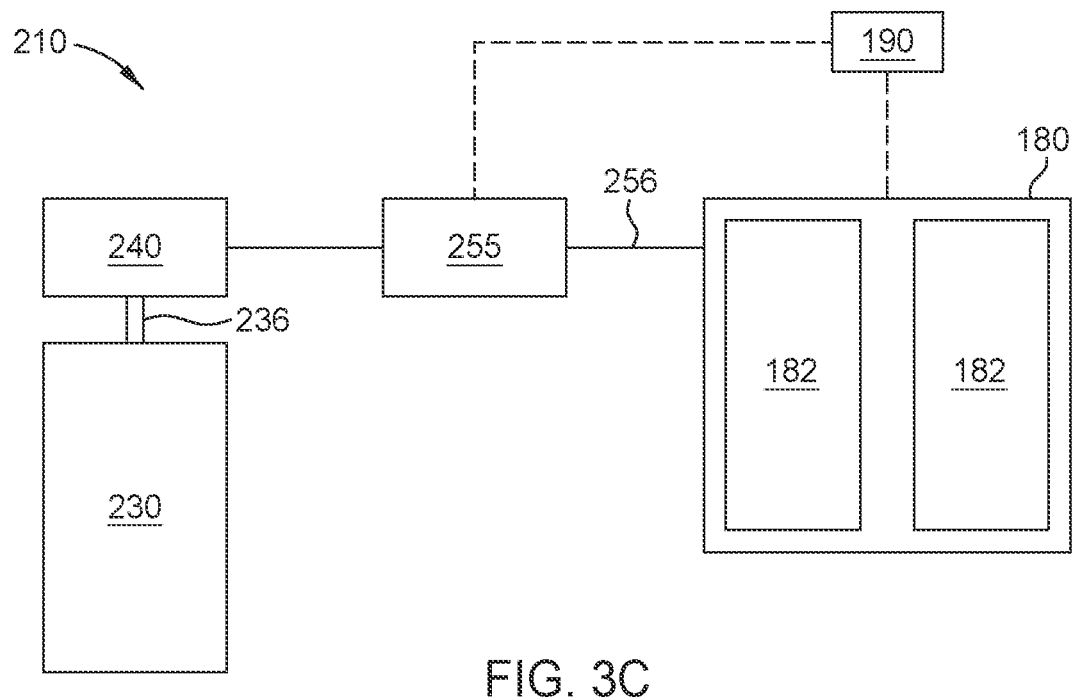

FIG. 3C schematically illustrates an exemplary configuration of the generator unit 210. In the illustrated example, the generator 240 is a three-phase generator. The generator 240 is electrically coupled to a converter 255, such as a three-phase rectifier or a three-phase inverter. The converter 255 converts the three-phase AC output of the generator 240 to DC, and conveys the DC electrical power to each battery 182 of the battery pack 180 via a DC bus 256. The local controller 190 controls operation of the converter 255 to vary an electrical braking torque applied to the generator 240. The braking torque is transmitted through the shaft 236 to the rotor of the turbine 230. Fluid flowing through the turbine 230 experiences a pressure drop due to the work done by the fluid to counteract the braking torque and rotate the rotor of the turbine 230.

In some embodiments, the converter 255 provides a measurement of the speed of rotation of the rotor of the turbine 230. In some embodiments, the converter 255 provides a measurement of the flowrate of fluid through the turbine derived from the measurement of the speed of rotation of the rotor of the turbine 230. In some embodiments, the converter 255 is operated to control the speed of rotation of the rotor of the turbine 230. In some embodiments, the converter 255 is operated to control the power output of the generator 240 transmitted to each battery 182 of the battery pack 180 via the DC bus 256. In some embodiments, the converter 255 is operated to control the pressure drop 276 experienced by the fluid flowing through the turbine 230.

In some embodiments, the converter 255 is included in the generator unit 210. In an example, each generator unit 210 includes a dedicated converter 255. In some embodiments, the converter 255 is located between each generator unit 210 and the battery pack 180. In some embodiments, the converter 255 is located at the battery pack 180. In some embodiments, the local electricity generator 200 includes a single converter 255. In some embodiments, the local electricity generator 200 includes more than one converter 255. In some embodiments, a single converter 255 may be coupled to a single generator 240. In some embodiments, a single converter 255 may be coupled to more than one generator 240.

Figure 3D:
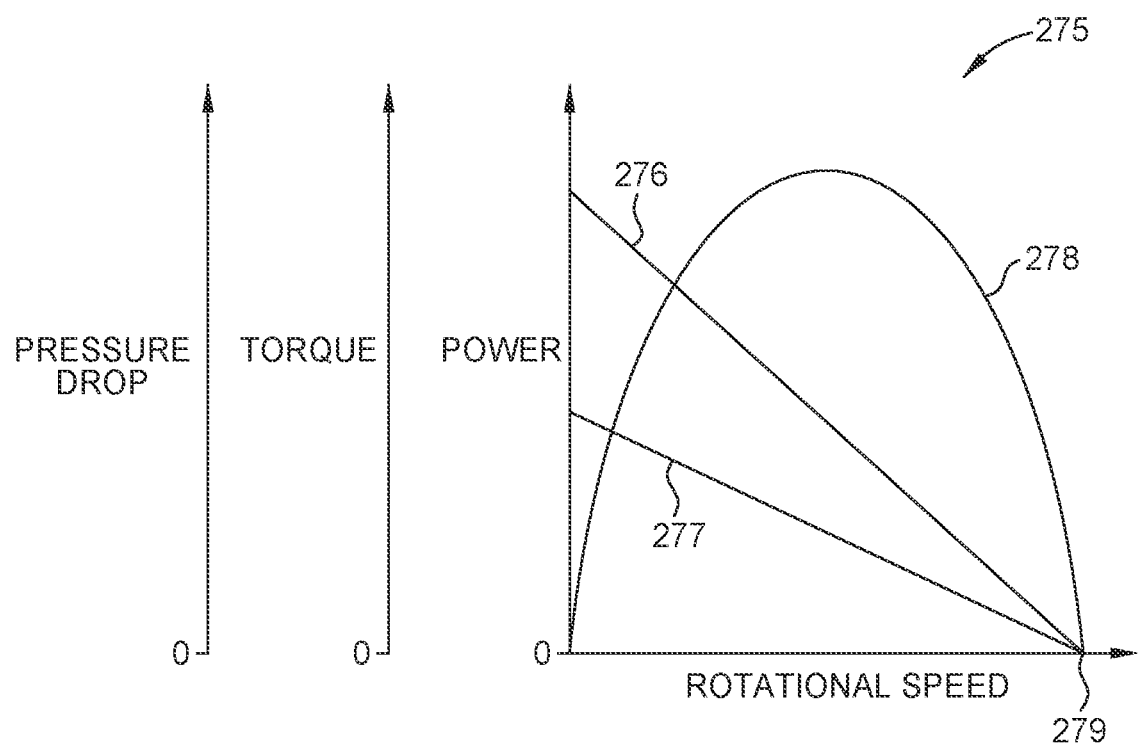
FIG. 3D depicts a graph schematically illustrating an exemplary performance of the power generation apparatus depicted in FIG. 3C.

FIG. 3D depicts a graph 275 schematically illustrating an exemplary performance of the generator 240. The X axis of the graph 275 is the rotational speed of the rotor of the turbine 230. The graph 275 includes three lines 276, 277, 278, each of which is plotted against a different one of three Y axes. Line 276 represents the pressure drop experienced by fluid flowing through the turbine 230 as a result of counteracting the braking torque 277 applied to the rotor of the turbine 230. Line 278 represents the power output of the generator 240. Point 279 represents the condition when no braking torque 277 is applied from the converter 255 via the generator 240 to the rotor of the turbine 230, and the rotor is free spinning.

When the rotor is free spinning, the fluid flowing through the turbine 230 experiences a negligible or zero pressure drop 276, and the power output 278 is zero. As the braking torque 277 applied from the converter 255 via the generator 240 to the rotor of the turbine 230 is increased, the rotational speed of the rotor decreases, and the pressure drop 276 experienced by the fluid flowing through the turbine 230 increases. Additionally, the power output 278 of the generator 240 increases, and reaches a maximum when the rotational speed of the rotor of the turbine 230 is at about 50% of the free spinning speed 279. Further increasing the braking torque 277 applied from the converter 255 via the generator 240 to the rotor of the turbine 230 results in the pressure drop 276 increasing, the rotational speed of the rotor decreasing, and the power output 278 of the generator 240 decreasing. When the braking torque 277 applied from the converter 255 via the generator 240 to the rotor of the turbine 230 is increased to a magnitude at which the fluid flowing through the turbine 230 does not turn the rotor, the rotor stops rotating, the pressure drop 276 reaches a maximum, and the power output 278 of the generator 240 falls to zero.

In some embodiments, the pressure drop 276 experienced by the fluid flowing through the turbine 230 is negligible compared to the pressure of the fluid at the inlet 232 of the turbine 230. In an example, the pressure drop 276 experienced by the fluid flowing through the turbine 230 is up to 5%, up to 4%, up to 3%, up to 2%, or up to 1% of the pressure of the fluid at the inlet 232 of the turbine 230. In some embodiments, the pressure drop 276 experienced by the fluid flowing through the turbine 230 is negligible compared to the pressure drop experienced by the fluid across a choke (such as choke 244 or choke 170) downstream of the turbine 230. In an example, the pressure drop 276 experienced by the fluid flowing through the turbine 230 is up to 5%, up to 4%, up to 3%, up to 2%, or up to 1% of the pressure drop experienced by the fluid across a choke downstream of the turbine 230.

In some embodiments, the choke 242 (FIG. 3B) is a fixed choke when the generator 240 is used with a converter 255. In some embodiments, the choke 242 (FIG. 3B) is a variable choke when the generator 240 is used with a converter 255. In some embodiments, the choke 242 is omitted when the generator 240 is used with a converter 255. In some embodiments, the choke 244 (FIG. 3B) is a fixed choke when the generator 240 is used with a converter 255. In some embodiments, the choke 244 (FIG. 3B) is a variable choke when the generator 240 is used with a converter 255. In some embodiments, the choke 244 is omitted when the generator 240 is used with a converter 255.

In some embodiments, the converter 255 may be omitted. In an example, the generator 240 may be a DC generator. The DC generator may be controlled by the controller 190 via a regulator.

Figure 4A:
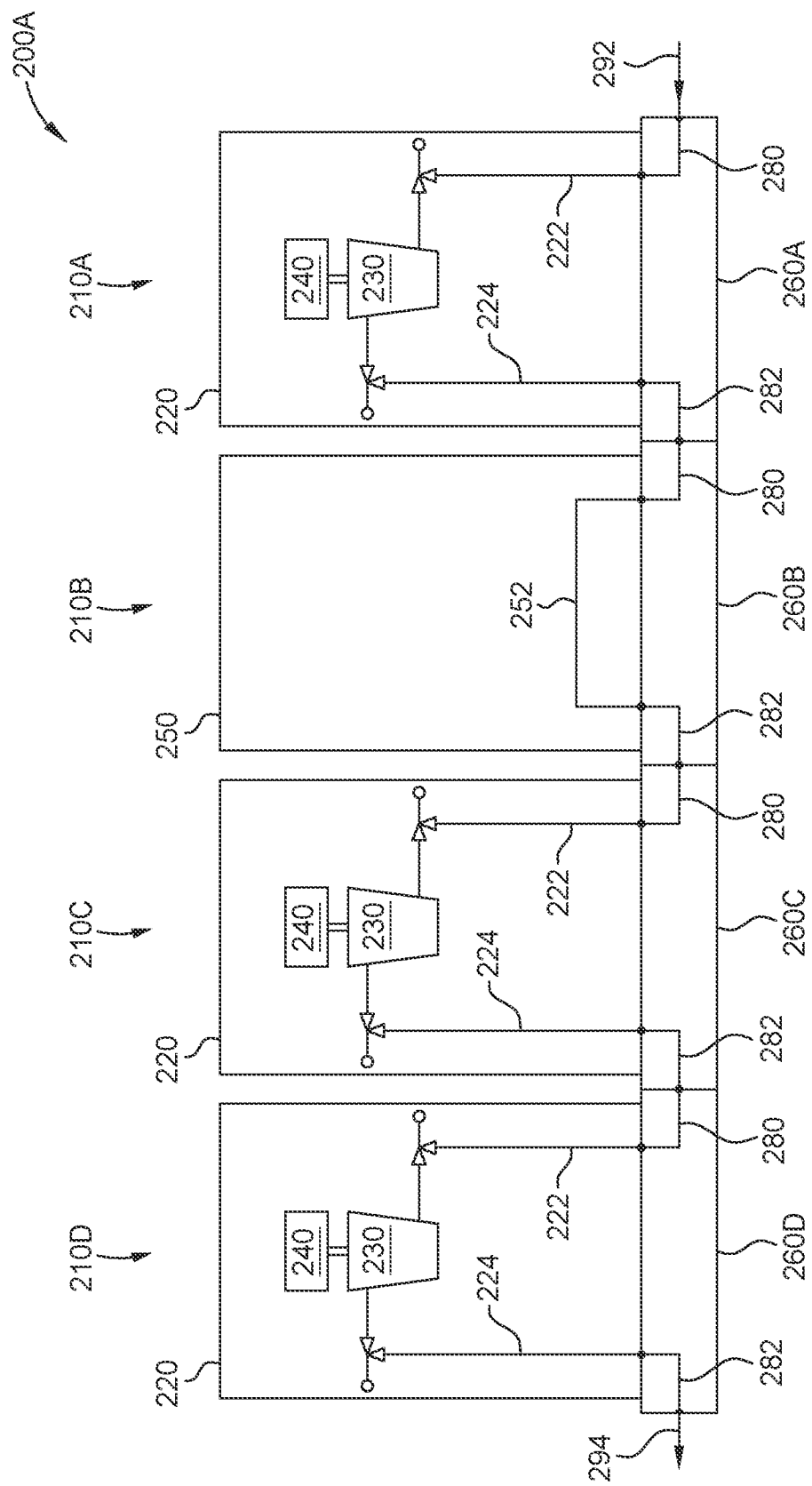
FIGS. 4A to 4D schematically illustrate exemplary configurations including the apparatus of FIGS. 3A to 3C.

FIGS. 4A to 4D schematically illustrate exemplary configurations of the local electricity generator 200. The local electricity generator 200 may include any of the apparatus depicted in FIGS. 3A to 3C. In FIG. 4A, the local electricity generator 200 is represented by local electricity generator 200A, which includes a plurality of generator units 210A, 210B, 210C, 210D arranged in series. Although four generator units are depicted, the local electricity generator 200 may include one, two, three, four, five, six, or more generator units. Each generator unit 210A, 210B, 210C, 210D includes a corresponding base 260A, 260B, 260C, 260D, respectively. Each base 260A, 260B, 260C, 260D includes an input conduit 280 and an output conduit 282, such as described above. Base 260A is coupled to base 260B, base 260B is coupled to base 260C, and base 260C is coupled to base 260D. The input flowline 292 is coupled to the input conduit 280 of base 260A. The output conduit 282 of base 260A is coupled to the input conduit 280 of base 260B. The output conduit 282 of base 260B is coupled to the input conduit 280 of base 260C. The output conduit 282 of base 260C is coupled to the input conduit 280 of base 260D. The output conduit 282 of base 260D is coupled to the output flowline 294.

Generator units 210A, 210C, and 210D are configured similarly to the generator unit 210 described above. Each generator unit 210A, 210C, and 210D includes a corresponding power generation module 220. Generator unit 210B is illustrated to provide an example of how operation of generator units 210A, 210C, and 210D may continue in the absence of a power generation module 220 from generator unit 210B (such as for maintenance or repair). The Figure shows a dummy module 250 has been installed on the base 260B in place of the power generation module of generator unit 210B. The dummy module 250 includes a conduit 252 that links the input conduit 280 of base 260B to the output conduit 282 of base 260B.

The fluid flows from the input flowline 292 to the input conduit 280 of base 260A, and into the power generation module 220 of generator unit 210A. The fluid flows from the power generation module 220 of generator unit 210A into the output conduit 282 of base 260A, and into the input conduit 280 of base 260B. The fluid flows from the input conduit 280 of base 260B into the conduit 252 of dummy module 250, and into the output conduit 282 of base 260B. The fluid flows from the output conduit 282 of base 260B into the input conduit 280 of base 260C, and into the power generation module 220 of generator unit 210C. The fluid flows from the power generation module 220 of generator unit 210C into the output conduit 282 of base 260C, and into the input conduit 280 of base 260D. The fluid flows from the input conduit 280 of base 260D into the power generation module 220 of generator unit 210D. The fluid flows from the power generation module 220 of generator unit 210D into the output conduit 282 of base 260D, and into the output flowline 294.

Figure 4B:
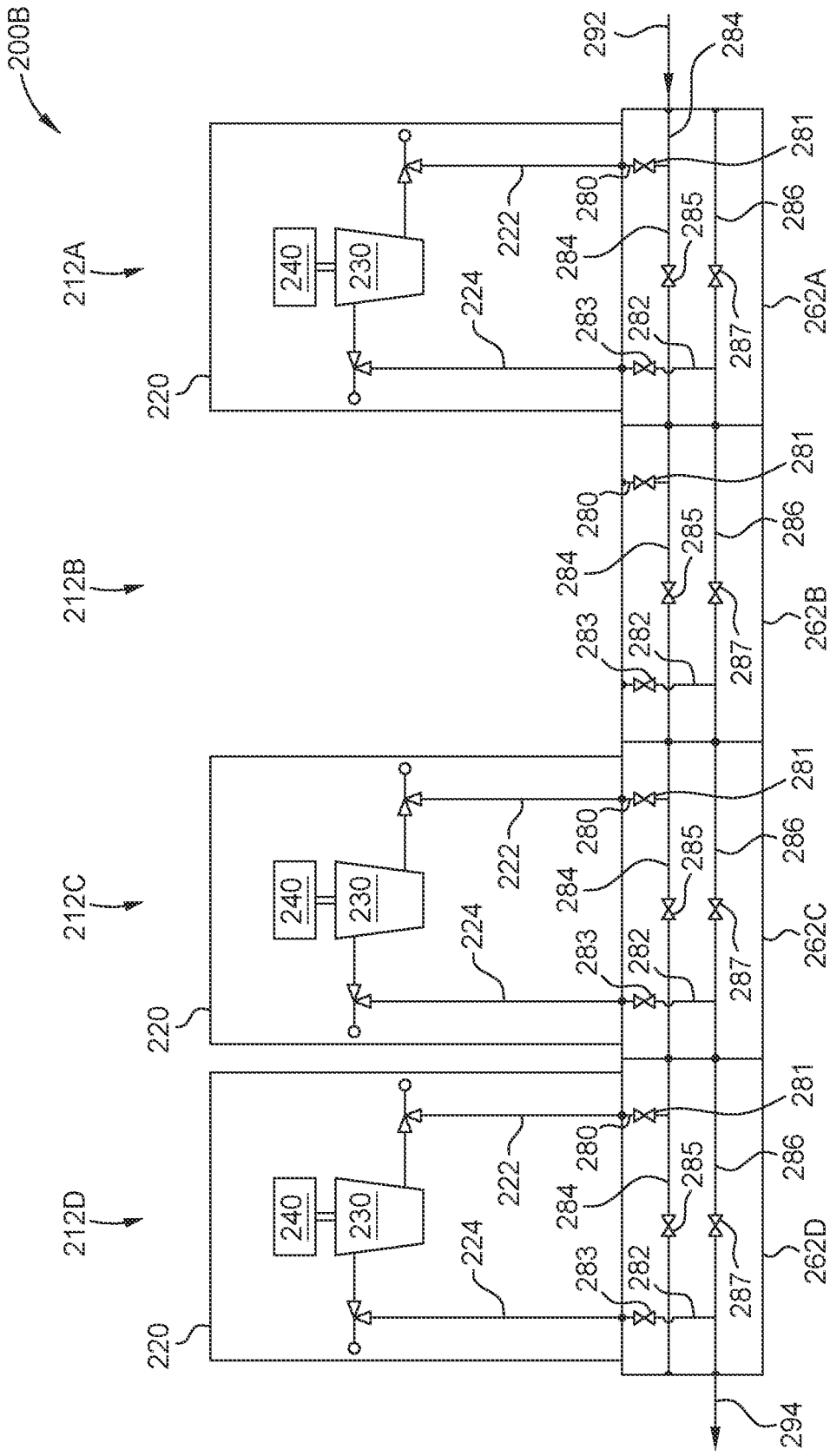

In FIG. 4B, the local electricity generator 200 is represented by local electricity generator 200B, which includes a plurality of generator units 212A, 212B, 212C, 212D arranged in parallel. Although four generator units are depicted, the local electricity generator 200 may include one, two, three, four, five, six, or more generator units. Each generator unit 212A, 212B, 212C, 212D includes a corresponding base 262A, 262B, 262C, 262D, respectively. Base 262A is coupled to base 262B, base 262B is coupled to base 262C, and base 262C is coupled to base 262D. Each base 262A, 262B, 262C, 262D includes an input header 284 and an output header 286. The input flowline 292 is coupled to the input header 284 of base 262A. The input header 284 of base 262A is coupled to the input header 284 of base 262B, and the output header 286 of base 262A is coupled to the output header 286 of base 262B. The input header 284 of base 262B is coupled to the input header 284 of base 262C, and the output header 286 of base 262B is coupled to the output header 286 of base 262C. The input header 284 of base 262C is coupled to the input header 284 of base 262D, and the output header 286 of base 262C is coupled to the output header 286 of base 262D. The output header 286 of base 262D is coupled to the output flowline 294.

In each base 262A, 262B, 262C, 262D, each input header 284 includes a header valve 285 that is adjustable between an open position and a closed position. In the open position, the header valve 285 allows fluid to flow through the input header 284, whereas in the closed position, the header valve 285 prevents fluid from flowing through the input header 284. In each base 262A, 262B, 262C, 262D, each output header 286 includes a header valve 287 that is adjustable between an open position and a closed position. In the open position, the header valve 287 allows fluid to flow through the output header 286, whereas in the closed position, the header valve 287 prevents fluid from flowing through the output header 286.

Each base 262A, 262B, 262C, 262D includes an input conduit 280, such as described above, that is coupled to the input header 284. Each input conduit 280 includes a conduit valve 281 that is adjustable between an open position and a closed position. In the open position, the conduit valve 281 allows fluid to flow through the input conduit 280, whereas in the closed position, the conduit valve 281 prevents fluid from flowing through the input conduit 280. Each base 262A, 262B, 262C, 262D includes an output conduit 282, such as described above, that is coupled to the output header 286. Each output conduit 282 includes a conduit valve 283 that is adjustable between an open position and a closed position. In the open position, the conduit valve 283 allows fluid to flow through the output conduit 282, whereas in the closed position, the conduit valve 283 prevents fluid from flowing through the output conduit 282.

Each generator unit 212A, 212C, and 212D includes a corresponding power generation module 220, described above. Generator unit 212B is illustrated to provide an example of how operation of generator units 212A, 212C, and 212D may continue in the absence of a power generation module from generator unit 212B (such as for maintenance, repair, or replacement). In the illustrated configuration, the header valve 285 of each of base 262A, 262C, and 262D is open to permit fluid to flow from the input flowline 292 to the input header 284 of each base 262A, 262B, 262C, 262D. The header valve 285 of base 262B may be closed to prevent the fluid from leaking out of the input header 284 of base 262B. The header valve 287 of each of base 262B, 262C, and 262D is open to permit fluid to flow from the output header 286 of each base 262A, 262B, 262C, 262D to the output flowline 294. The header valve 287 of base 262A may be closed to prevent the fluid from leaking out of the output header 286 of base 262A.

The conduit valve 281 of each of base 262A, 262C, and 262D is open to permit the fluid to flow from the input header 284 of each of base 262A, 262C, and 262D into the entry conduit 222 of each corresponding power generation module 220 of generator unit 212A, 212C, and 212D. The conduit valve 281 of base 262B is closed to prevent the fluid from leaking out of the input conduit 280 of base 262B. The conduit valve 283 of each of base 262A, 262C, and 262D is open to permit the fluid to flow from the exit conduit 224 of each power generation module 220 of generator unit 212A, 212C, and 212D into the corresponding output header 286 of each of base 262A, 262C, and 262D. The conduit valve 283 of base 262B is closed to prevent the fluid from leaking out of the output conduit 282 of base 262B.

The fluid flows from the input flowline 292 into the coupled input headers 284 of bases 262A, 262B, 262C, and 262D. The fluid flows from the input header 284 of each of base 262A, 262C, and 262D, through the corresponding input conduit 280 of each of base 262A, 262C, and 262D, and into the corresponding power generation module 220 of generator unit 212A, 212C, and 212D, respectively. The fluid flows out of each power generation module 220 of generator unit 212A, 212C, and 212D, into the corresponding output conduit 282 of each of base 262A, 262C, and 262D, and into the corresponding output header 286 of each of base 262A, 262C, and 262D, respectively. The fluid flows from the coupled output headers 286 of bases 262A, 262B, 262C, and 262D into the output flowline 294.

Figure 4C:
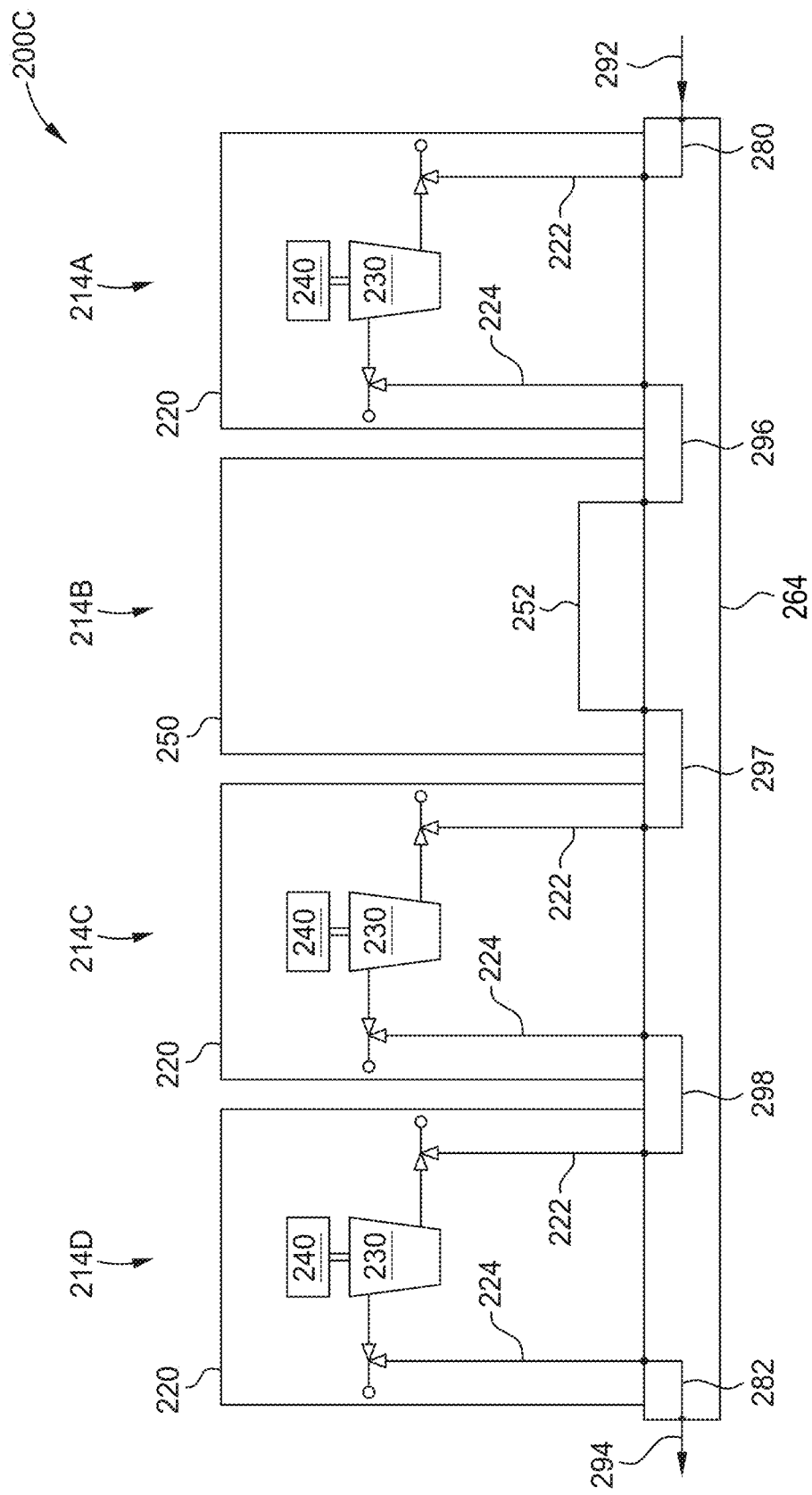

In FIG. 4C, the local electricity generator 200 is represented by local electricity generator 200C, which includes a plurality of generator units 214A, 214B, 214C, 214D arranged in series on a common base 264. Although four generator units are depicted, the local electricity generator 200 may include one, two, three, four, five, six, or more generator units. In the illustrated example, the base 264 is configured to couple to four power generation modules, each power generation module being part of a corresponding generator unit 214A, 214B, 214C, or 214D. In some embodiments, the base 264 may be configured to couple to one, two, three, four, five, six, or more power generation modules. The base 264 includes an input conduit 280, such as described above, in generator unit 214A that is coupled to the input flowline 292. The base 264 includes an output conduit 282, such as described above, in generator unit 214D that is coupled to the output flowline 294. The base 264 includes an intermediate conduit 296 that functions as an output conduit of generator unit 214A and an input conduit of generator unit 214B. The base 264 includes an intermediate conduit 297 that functions as an output conduit of generator unit 214B and an input conduit of generator unit 214C. The base 264 includes an intermediate conduit 298 that functions as an output conduit of generator unit 214C and an input conduit of generator unit 214D.

Each generator unit 214A, 214C, and 214D includes a corresponding power generation module 220, described above, disposed on the base 264. Generator unit 214B is illustrated to provide an example of how operation of generator units 214A, 214C, and 214D may continue in the absence of a power generation module from generator unit 214B (such as for maintenance or repair). The Figure shows the dummy module 250 has been installed on the base 264 at generator unit 214B in place of a power generation module.

The fluid flows from the input flowline 292 to the input conduit 280 of base 264 at generator unit 214A, and into the power generation module 220 of generator unit 214A. The fluid flows from the power generation module 220 of generator unit 214A into the intermediate conduit 296 at generator unit 214A, and into generator unit 214B. The fluid flows from the intermediate conduit 296 at generator unit 214B into the conduit 252 of dummy module 250, into the intermediate conduit 297 at generator unit 214B, and into generator unit 214C. The fluid flows from the intermediate conduit 297 at generator unit 214C into the power generation module 220 of generator unit 214C. The fluid flows from the power generation module 220 of generator unit 214C into the intermediate conduit 298 at generator unit 214C, and into the generator unit 214D. The fluid flows from the intermediate conduit 298 at generator unit 214D into the power generation module 220 of generator unit 214D. The fluid flows from the power generation module 220 of generator unit 214D into the output conduit 282 at generator unit 214D, and into the output flowline 294.

Figure 4D:
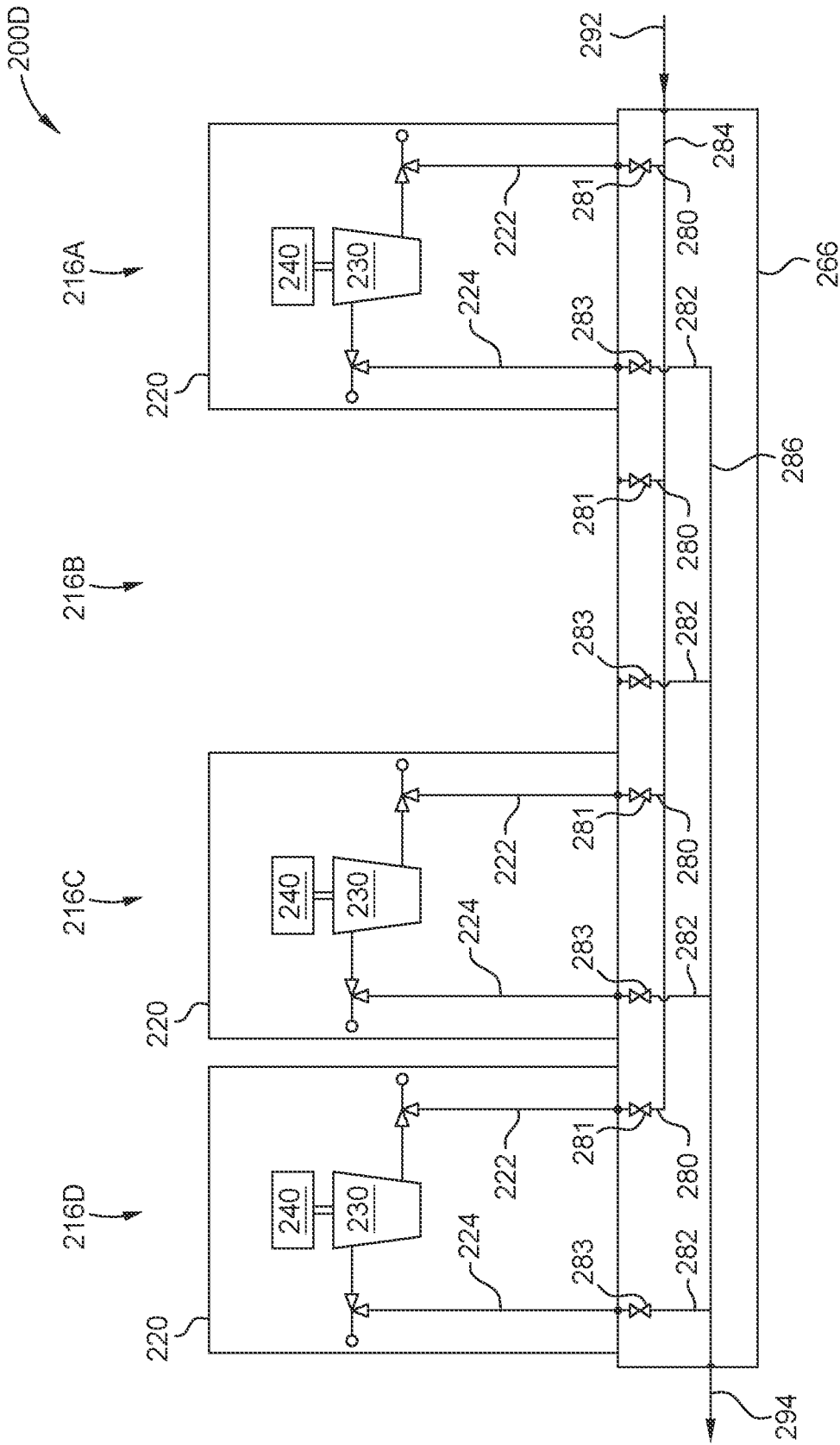

In FIG. 4D, the local electricity generator 200 is represented by local electricity generator 200D, which includes a plurality of generator units 216A, 216B, 216C, 216D arranged in parallel on a common base 266. Although four generator units are depicted, the local electricity generator 200 may include one, two, three, four, five, six, or more generator units. In the illustrated example, the base 266 is configured to couple to four power generation modules, each power generation module being part of a corresponding generator unit 216A, 216B, 216C, or 216D. In some embodiments, the base 266 may be configured to couple to one, two, three, four, five, six, or more power generation modules. The base 266 includes an input header 284, such as described above, coupled to the input flowline 292. The base 266 includes an output header 286, such as described above, coupled to the output flowline 294.

Each generator unit 216A, 216B, 216C, and 216D includes an input conduit 280, such as described above. Each input conduit 280 is coupled to the input header 284. Each input conduit 280 includes a conduit valve 281, as described above. Each generator unit 216A, 216B, 216C, and 216D includes an output conduit 282, such as described above. Each output conduit 282 is coupled to the output header 286. Each output conduit 282 includes a conduit valve 283, as described above.

Each generator unit 216A, 216C, and 216D includes a corresponding power generation module 220, described above, disposed on the base 266. Generator unit 216B is illustrated to provide an example of how operation of generator units 216A, 216C, and 216D may continue in the absence of a power generation module from generator unit 216B (such as for maintenance, repair, or replacement).

The conduit valve 281 of each of generator unit 216A, 216C, and 216D is open to permit the fluid to flow from the input header 284 into the entry conduit 222 of each corresponding power generation module 220 of generator unit 216A, 216C, and 216D. The conduit valve 281 of generator unit 216B is closed to prevent the fluid from leaking out of the input conduit 280 of generator unit 216B. The conduit valve 283 of each of generator unit 216A, 216C, and 216D is open to permit the fluid to flow from the exit conduit 224 of each power generation module 220 of generator unit 216A, 216C, and 216D into the output header 286. The conduit valve 283 of generator unit 216B is closed to prevent the fluid from leaking out of the output conduit 282 of generator unit 216B.

The fluid flows from the input flowline 292 into the input header 284. The fluid flows from the input header 284, through the input conduit 280 of each of generator unit 216A, 216C, and 216D, and into each corresponding power generation module 220 of generator unit 216A, 216C, and 216D, respectively. The fluid flows out of each power generation module 220 of generator unit 216A, 216C, and 216D, into each corresponding output conduit 282 of each of generator unit 216A, 216C, and 216D, respectively, and into the output header 286. The fluid flows from the output header 286 into the output flowline 294.

FIGS. 5A to 5G schematically illustrate examples of the local electricity generator 200 coupled to the well 150. In the illustrated examples, the wellsite 130 is subsea. The well 150 at the wellsite 130 penetrates the seabed 140. In other examples, the wellsite 130 may be on land, and the well 150 penetrates the ground surface. In some embodiments, the local electricity generator 200 may include a single generator unit, such as generator unit 210 (FIGS. 3A and 3B), or a plurality of generator units. In some embodiments, the local electricity generator 200 may be configured as any one or more of the local electricity generators 200A, 200B, 200C, or 200D, and may include any electricity generation apparatus or configuration described and/or illustrated in the present disclosure. In each of FIGS. 5A to 5G, the local electricity generator 200 generates electricity from the flow of a fluid in the fluid injection system 100.

In some embodiments, the well 150 is a production well. As illustrated, in some embodiments, the well 150 is an injection well. In the illustrated examples, the fluid is, or includes, a pressurized fluid that is injected into the well 150 for placement in a subterranean formation. In some embodiments, the pressurized fluid is, or includes, at least one of water, a hydrocarbon, or carbon dioxide. In other examples, the pressurized fluid is, or includes, a treatment fluid that is injected into the well 150. In some embodiments, the treatment fluid is, or includes, water, a corrosion inhibitor, a hydrate inhibitor (such as a glycol), a wax inhibitor, a sulfide scavenger, or the like. In some embodiments, the treatment fluid is injected into an annulus surrounding the tubing string 154 in the well 150.

Figure 5A:
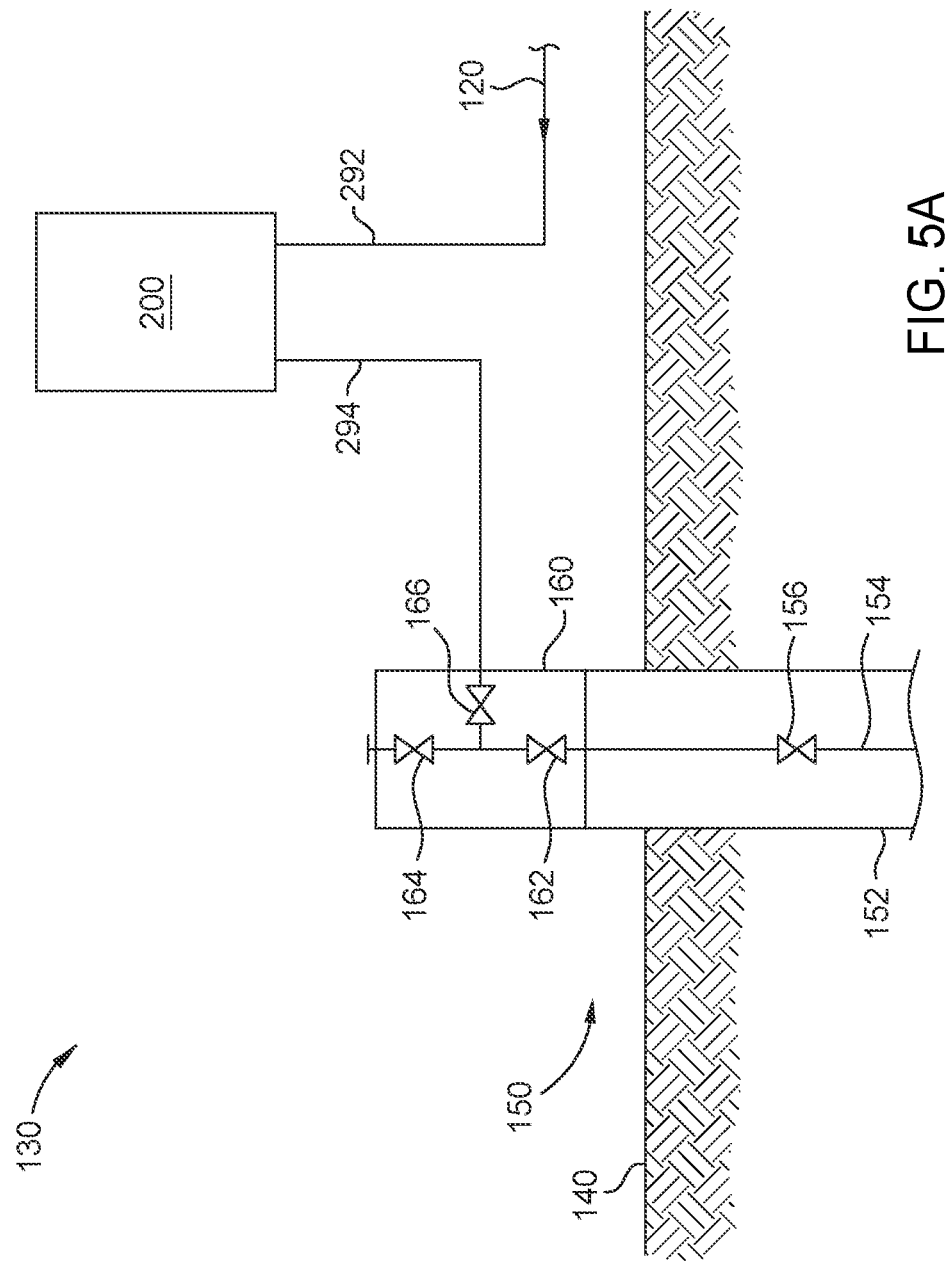

In FIG. 5A, the local electricity generator 200 is interposed between the injection flowline 120 and the well 150. The input flowline 292 is a portion of, or is coupled to, the injection flowline 120, such as described above. The fluid flows from the injection flowline 120, through the input flowline 292 to the local electricity generator 200. The local electricity generator 200 generates electricity using the flow of the fluid, as described above. The fluid exits the local electricity generator 200 and flows through the output flowline 294 to the tree 160 of the well 150. The output flowline 294 is coupled to the tree 160 upstream of the wing valve 166 of the tree 160. The fluid flows through the wing valve 166 and the master valve 162, and into the tubing string 154. The fluid flows through the tubing string 154 and into the subterranean formation.

In the illustrated example, there is no injection choke 170 between the local electricity generator 200 and the tree 160. In some embodiments, one or more generator units of the local electricity generator 200 includes the choke 242 (FIGS. 3A, 3B) in a configuration to function as the injection choke 170. In some embodiments, one or more generator units of the local electricity generator 200 includes the choke 244 (FIGS. 3A, 3B) in a configuration to function as the injection choke 170. In some embodiments, the choke 242 is omitted from one or more generator units of the local electricity generator 200. In some embodiments, the choke 244 is omitted from one or more generator units of the local electricity generator 200. In some embodiments, the input flowline 292 is coupled to the injection choke 170 upstream of the local electricity generator 200.

As illustrated, in some embodiments, all the fluid that flows from the injection flowline 120 into the well 150 flows through the local electricity generator 200. In some embodiments, the local electricity generator 200 generates electricity continually while the fluid flows into the well 150. In some embodiments, in one or more generator units of the local electricity generator 200, the generator 240 is temporarily disconnected from the turbine 230 (FIGS. 3A, 3B) such as described above. In some embodiments, the generator 240 may be temporarily disconnected from one or more batteries 182 of the battery pack 180 (FIG. 2), such as described above.

Figure 5B:
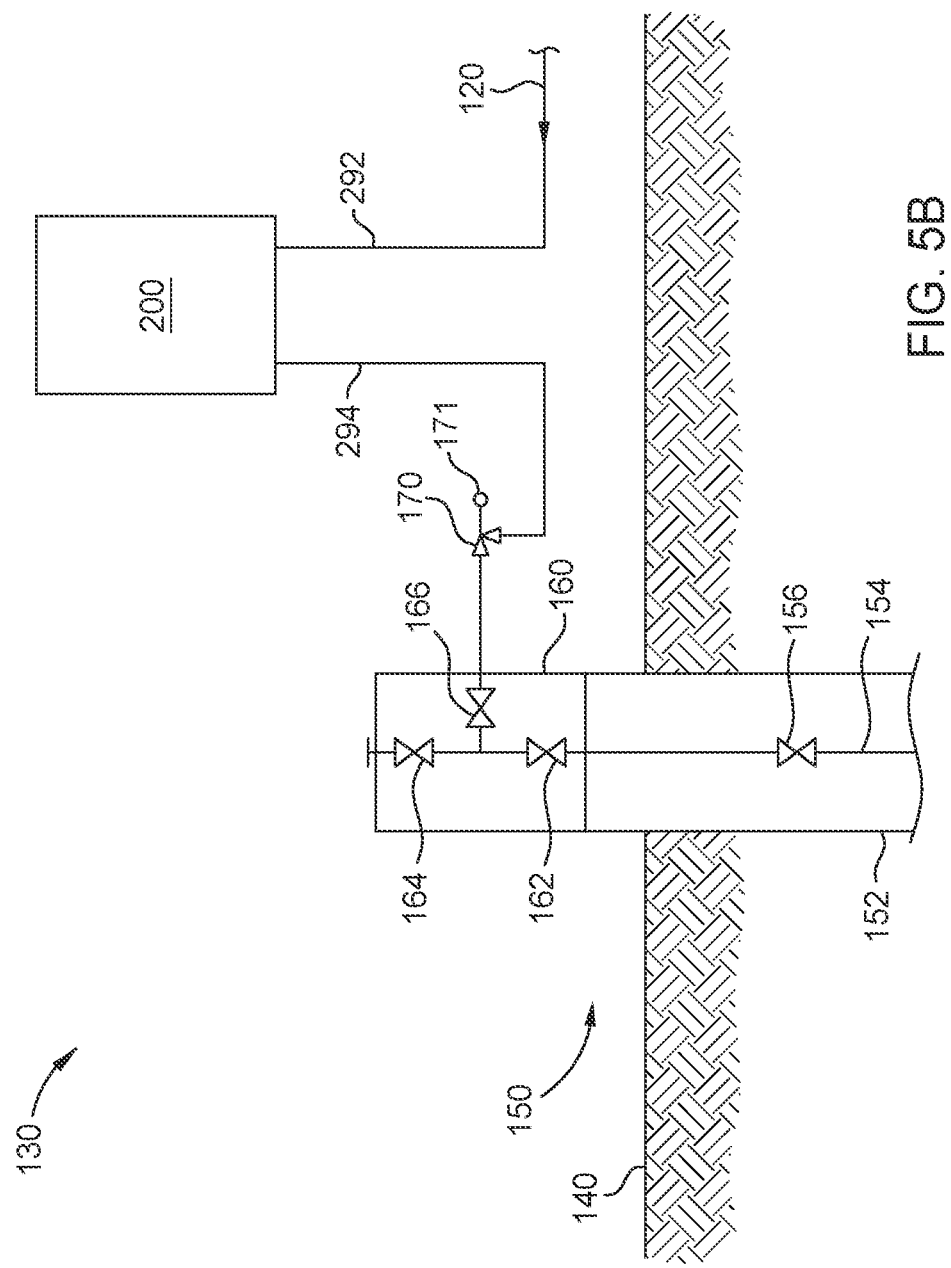

In FIG. 5B, the local electricity generator 200 is interposed between the injection flowline 120 and the well 150. The input flowline 292 is a portion of, or is coupled to, the injection flowline 120, such as described above. The fluid flows from the injection flowline 120, through the input flowline 292 to the local electricity generator 200. The local electricity generator 200 generates electricity using the flow of the fluid, as described above. The fluid exits the local electricity generator 200 and flows through the output flowline 294 to the tree 160 of the well 150. The output flowline 294 is coupled to the injection choke 170, which is coupled to the tree 160 upstream of the wing valve 166 of the tree 160. In some embodiments, the injection choke 170 is directly coupled to the tree 160. In some embodiments, the injection choke 170 is not directly coupled to the tree 160. The fluid flows through the wing valve 166 and the master valve 162, and into the tubing string 154. The fluid flows through the tubing string 154 and into the subterranean formation.

In some embodiments, the injection choke 170 is configured to function as the choke 244 in one or more generator units of the local electricity generator 200. In some of such embodiments, the choke 244 is omitted from one or more generator units of the local electricity generator 200. In some embodiments, the choke 242 is omitted from one or more generator units of the local electricity generator 200.

As illustrated, in some embodiments, all the fluid that flows from the injection flowline 120 into the well 150 flows through the local electricity generator 200. In some embodiments, the local electricity generator 200 generates electricity continually while the fluid flows into the well 150. In some embodiments, in one or more generator units of the local electricity generator 200, the generator 240 is temporarily disconnected from the turbine 230 (FIGS. 3A, 3B) such as described above. In some embodiments, the generator 240 may be temporarily disconnected from one or more batteries 182 of the battery pack 180 (FIG. 2), such as described above.

In FIG. 5C, the local electricity generator 200 is interposed between the injection flowline 120 and the well 150. The input flowline 292 is a portion of, or is coupled to, the injection flowline 120, such as described above. The fluid flows from the injection flowline 120, through the input flowline 292 to the local electricity generator 200. The local electricity generator 200 generates electricity using the flow of the fluid, as described above. The fluid exits the local electricity generator 200 and flows through the output flowline 294 to the tree 160 of the well 150. The injection choke 170 is represented by a fixed injection choke 173, to which the output flowline 294 is coupled. The fluid flows through the fixed injection choke 173, the wing valve 166, the master valve 162, and into the tubing string 154. The fluid flows through the tubing string 154 and into the subterranean formation.

In some embodiments, the fixed injection choke 173 is directly coupled to the tree 160. In some embodiments, the fixed injection choke 173 is not directly coupled to the tree 160. In some embodiments, the fixed injection choke 173 includes a replaceable bean. In some embodiments, the fixed injection choke 173 is configured to function as the choke 244 in one or more generator units of the local electricity generator 200. In some of such embodiments, the choke 244 is omitted from one or more generator units of the local electricity generator 200. In some embodiments, the choke 242 is omitted from one or more generator units of the local electricity generator 200.

As illustrated, in some embodiments, all the fluid that flows from the injection flowline 120 into the well 150 flows through the local electricity generator 200. In some embodiments, the local electricity generator 200 generates electricity continually while the fluid flows into the well 150. In some embodiments, in one or more generator units of the local electricity generator 200, the generator 240 is temporarily disconnected from the turbine 230 (FIGS. 3A, 3B) such as described above. In some embodiments, the generator 240 may be temporarily disconnected from one or more batteries 182 of the battery pack 180 (FIG. 2), such as described above.

Figure 5D:
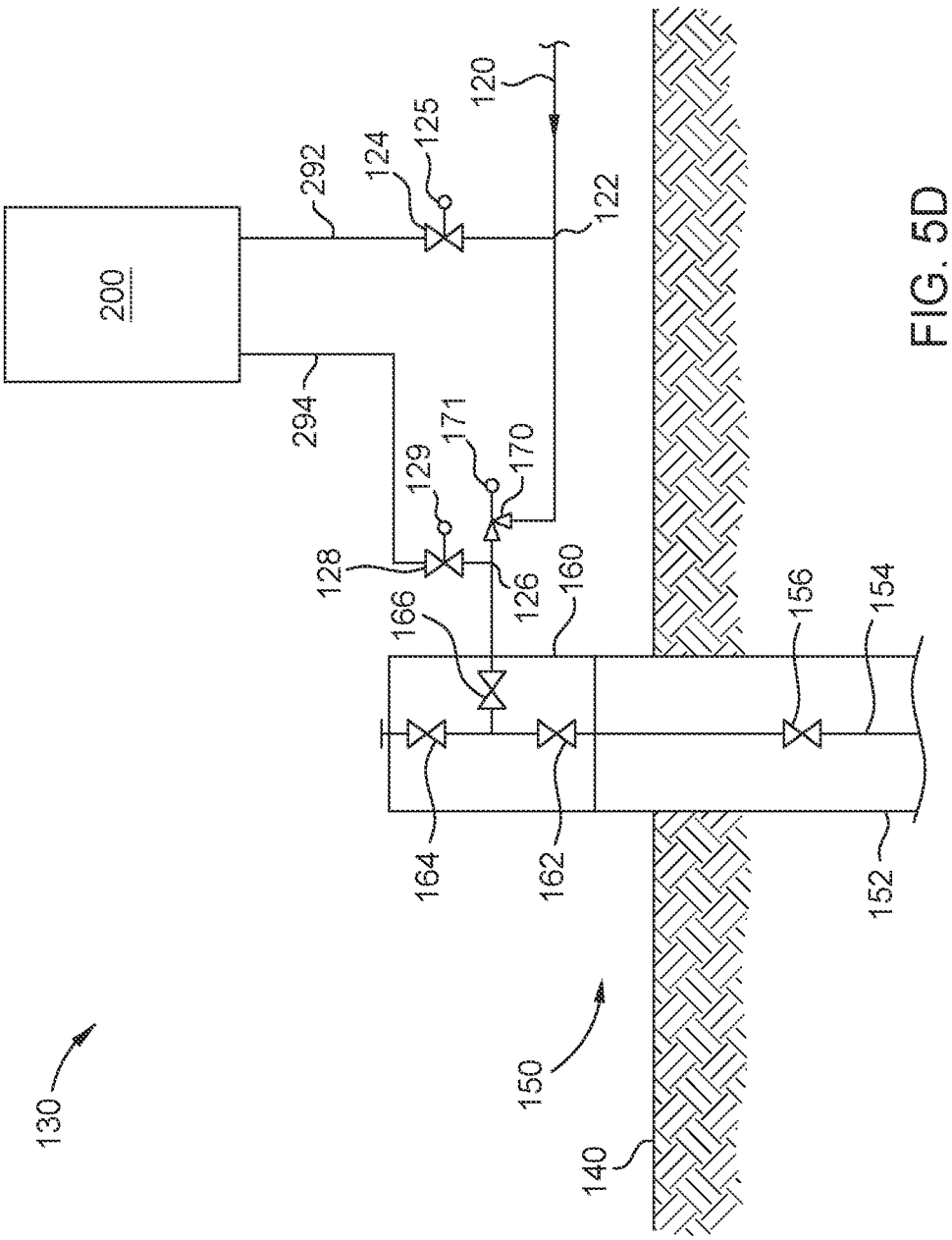

In FIG. 5D, the local electricity generator 200 is disposed in a bypass of the injection flowline 120. The injection flowline 120 is coupled to the tree 160 of the well 150 upstream of the wing valve 166. The injection choke 170 is coupled to the injection flowline 120 upstream of the tree 160. In some embodiments, the injection choke 170 is directly coupled to the tree 160. In some embodiments, the injection choke 170 is not directly coupled to the tree 160.

The input flowline 292 of the local electricity generator 200 is coupled to the injection flowline 120 (such as by a tee joint) at a branch point 122 upstream of the injection choke 170. The input flowline 292 includes a valve 124 that is adjustable between an open position and a closed position. In the open position, the valve 124 allows fluid to flow through the input flowline 292 to the local electricity generator 200, whereas in the closed position, the valve 124 prevents fluid from flowing through the input flowline 292 to the local electricity generator 200. The valve 124 is operated by an actuator 125. In some embodiments, the actuator 125 is an electrically-powered actuator. In some embodiments, the valve 124 is controlled by the local controller (190, FIG. 2).

The output flowline 294 of the local electricity generator 200 is coupled to the injection flowline 120 (such as by a tee joint) at a branch point 126 downstream of the injection choke 170. The output flowline 294 includes a valve 128 that is adjustable between an open position and a closed position. In the open position, the valve 128 allows fluid to flow from the local electricity generator 200 through the output flowline 294, whereas in the closed position, the valve 128 prevents fluid from flowing from the local electricity generator 200 through the output flowline 294. The valve 128 is operated by an actuator 129. In some embodiments, the actuator 129 is an electrically-powered actuator. In some embodiments, the valve 128 is controlled by the local controller (190, FIG. 2).

At least a first portion of the fluid in the injection flowline 120 flows along the injection flowline 120, and through the injection choke 170 to the tree 160 of the well 150. When the valve 124 and the valve 128 are open, a second portion of the fluid in the injection flowline 120 flows into the input flowline 292 at the branch point 122, and to the local electricity generator 200. The local electricity generator 200 generates electricity using the flow of the second portion of the fluid, as described above.

The second portion of the fluid exits the local electricity generator 200 and flows through the output flowline 294 to the branch point 126. The second portion of the fluid flows into the injection flowline 120 at the branch point 126 and commingles with the first portion of the fluid. The commingled fluid flows in the injection flowline 120 to the tree 160. The commingled fluid flows through the wing valve 166 and the master valve 162, and into the tubing string 154. The commingled fluid flows through the tubing string 154 and into the subterranean formation.

In some embodiments, the local electricity generator 200 generates electricity continually while the fluid flows into the well 150. In some embodiments, the generation of electricity by the local electricity generator 200 is ceased while the fluid flows into the well 150. In an example, the flow of fluid through the local electricity generator 200 is ceased by closing the valve 124 or the valve 128. In some embodiments, the generation of electricity by the local electricity generator 200 is recommenced, such as by reopening the valve (valve 124 or valve 128) that had been closed.

In some embodiments, the flow of fluid through the local electricity generator 200 is ceased in response to one or more batteries 182 of the battery pack 180 (FIG. 2) being charged up to, or beyond, a selected threshold level, such as 90%, 95%, 97%, 98%, 99%, or 100%. In some embodiments, the flow of fluid through the local electricity generator 200 is recommenced in response to the charge of one or more batteries 182 of the battery pack 180 falling to, or beyond, a selected threshold level, such as 95%, 90%, 85%, 80%, 75%, 70%, 65%, 60%, 55%, 50%, or less.

In some embodiments, in one or more generator units of the local electricity generator 200, the generator 240 is temporarily disconnected from the turbine 230 (FIGS. 3A, 3B) such as described above. In some embodiments, the generator 240 may be temporarily disconnected from one or more batteries 182 of the battery pack 180, such as described above.

Figure 5E:
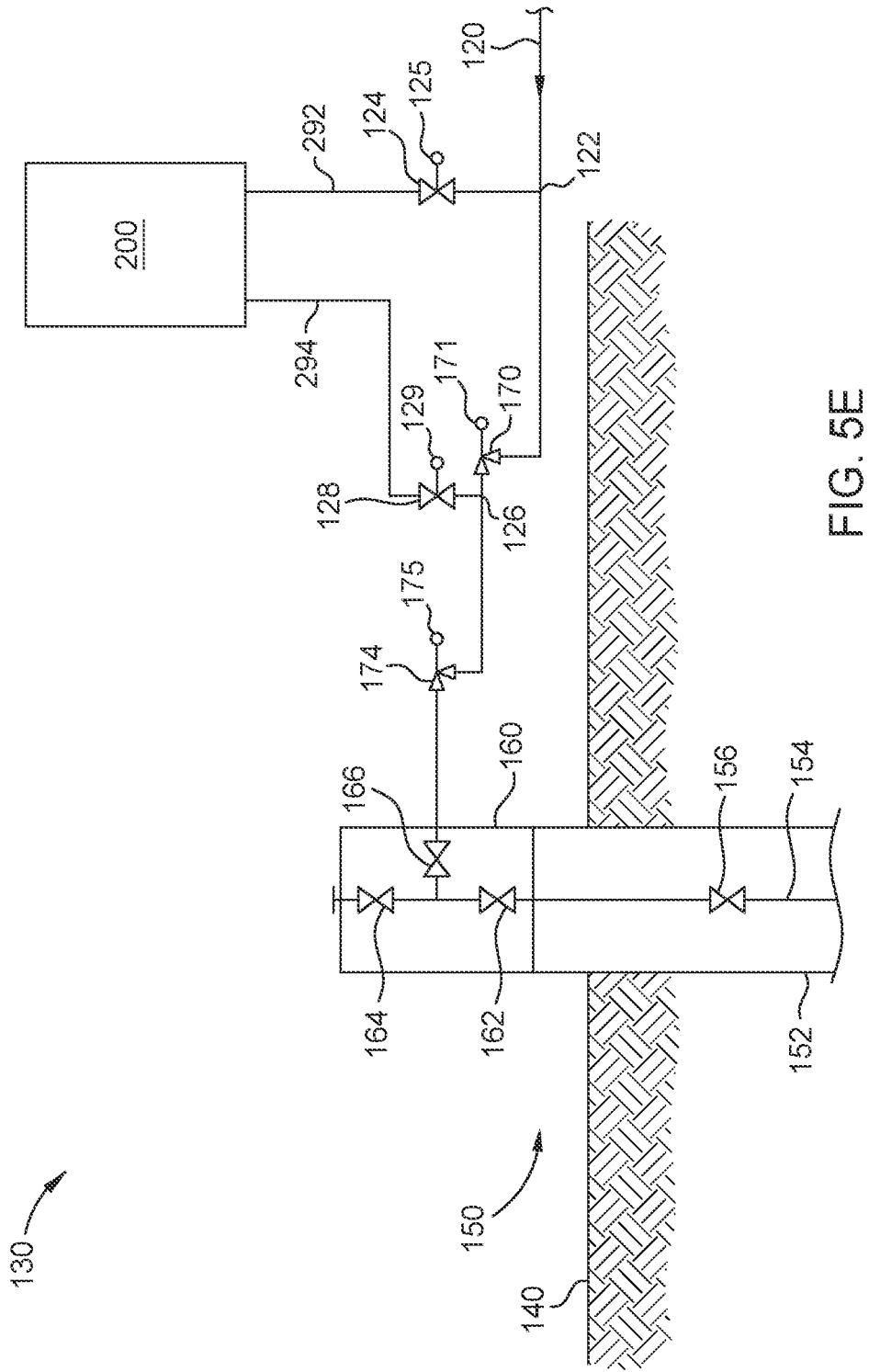

In FIG. 5E, the local electricity generator 200 is disposed in a bypass of the injection flowline 120. The injection flowline 120 is coupled to the tree 160 of the well 150 upstream of the wing valve 166. The injection choke 170 is coupled to the injection flowline 120 upstream of the tree 160. A second injection choke 174 is coupled to the injection flowline upstream of the tree 160 and downstream of the injection choke 170. In some embodiments, the second injection choke 174 is directly coupled to the tree 160. In some embodiments, the second injection choke 174 is not directly coupled to the tree 160. In some embodiments, the second injection choke 174 is a variable choke operated by an actuator 175. In some embodiments, the actuator 175 is an electrically-powered actuator. In some embodiments, the second injection choke 174 is controlled by the local controller (190, FIG. 2). In some embodiments, the second injection choke 174 is a fixed choke.

The input flowline 292 of the local electricity generator 200 is coupled to the injection flowline 120 (such as by a tee joint) at the branch point 122 upstream of the injection choke 170. The input flowline 292 includes the valve 124, described above. The output flowline 294 of the local electricity generator 200 is coupled to the injection flowline 120 (such as by a tee joint) at the branch point 126. The branch point 126 is downstream of the injection choke 170 and upstream of the second injection choke 174. The output flowline 294 includes the valve 128, described above.

At least a first portion of the fluid in the injection flowline 120 flows along the injection flowline 120, and through the injection choke 170 to the tree 160 of the well 150. When the valve 124 and the valve 128 are open, a second portion of the fluid in the injection flowline 120 flows into the input flowline 292 at the branch point 122, and to the local electricity generator 200. The local electricity generator 200 generates electricity using the flow of the second portion of the fluid, as described above.

The second portion of the fluid exits the local electricity generator 200 and flows through the output flowline 294 to the branch point 126. The second portion of the fluid flows into the injection flowline 120 at the branch point 126 and commingles with the first portion of the fluid. The commingled fluid flows in the injection flowline 120 through the second injection choke 174 to the tree 160. The commingled fluid flows through the wing valve 166 and the master valve 162, and into the tubing string 154. The commingled fluid flows through the tubing string 154 and into the subterranean formation.

In some embodiments, the second injection choke 174 is configured to function as the choke 244 in one or more generator units of the local electricity generator 200. In some of such embodiments, the choke 244 is omitted from one or more generator units of the local electricity generator 200. In some embodiments, the choke 242 is omitted from one or more generator units of the local electricity generator 200.

In some embodiments, the second injection choke 174 is operated such that the pressure within the injection choke 170 is maintained above a cavitation threshold pressure. In some embodiments, the second injection choke 174 is operated such that the pressure within the choke 244 is maintained above a cavitation threshold pressure. In some embodiments, the second injection choke 174 is operated such that the pressure within the choke 242 is maintained above a cavitation threshold pressure. In some embodiments, the second injection choke 174 is operated such that the pressure within the second injection choke 174 is maintained above a cavitation threshold pressure.

In some embodiments, the local electricity generator 200 generates electricity continually while the fluid flows into the well 150. In some embodiments, the generation of electricity by the local electricity generator 200 is ceased while the fluid flows into the well 150. In an example, the flow of fluid through the local electricity generator 200 is ceased by closing the valve 124 or the valve 128. In some embodiments, the generation of electricity by the local electricity generator 200 is recommenced, such as by reopening the valve (valve 124 or valve 128) that had been closed.

In some embodiments, the flow of fluid through the local electricity generator 200 is ceased in response to one or more batteries 182 of the battery pack 180 (FIG. 2) being charged up to, or beyond, a selected threshold level, such as 90%, 95%, 97%, 98%, 99%, or 100%. In some embodiments, the flow of fluid through the local electricity generator 200 is recommenced in response to the charge of one or more batteries 182 of the battery pack 180 falling to, or beyond, a selected threshold level, such as 95%, 90%, 85%, 80%, 75%, 70%, 65%, 60%, 55%, 50%, or less.

In some embodiments, in one or more generator units of the local electricity generator 200, the generator 240 is temporarily disconnected from the turbine 230 (FIGS. 3A, 3B) such as described above. In some embodiments, the generator 240 may be temporarily disconnected from one or more batteries 182 of the battery pack 180, such as described above.

In FIG. 5F, the local electricity generator 200 is disposed in a bypass of the injection flowline 120. The injection flowline 120 is coupled to the tree 160 of the well 150 upstream of the wing valve 166. The injection choke 170 is represented by a multistage choke 176. The multistage choke 176 is coupled to the injection flowline 120 upstream of the tree 160. In some embodiments, the multistage choke 176 is directly coupled to the tree 160. In some embodiments, the multistage choke 176 is not directly coupled to the tree 160. In some embodiments, the multistage choke 176 is a variable choke operated by an actuator 177. In some embodiments, the actuator 177 is an electrically-powered actuator. In some embodiments, the multistage choke 176 is controlled by the local controller (190, FIG. 2). The multistage choke 176 includes a first choke stage 176A and a second choke stage 176B. In some embodiments, at least one of the first choke stage 176A or the second choke stage 176B includes a fixed choke.

The input flowline 292 of the local electricity generator 200 is coupled to the injection flowline 120 (such as by a tee joint) at the branch point 122 upstream of the injection choke 170. The input flowline 292 includes the valve 124, described above. The output flowline 294 of the local electricity generator 200 includes the valve 128, described above. The output flowline 294 is coupled to the injection flowline 120 at the branch point 126. The branch point 126 is incorporated in the multistage choke 176. The branch point 126 is downstream of the first choke stage 176A and upstream of the second choke stage 176B.

At least a first portion of the fluid in the injection flowline 120 flows along the injection flowline 120, and through the first choke stage 176A of the multistage choke 176 to the tree 160 of the well 150. When the valve 124 and the valve 128 are open, a second portion of the fluid in the injection flowline 120 flows into the input flowline 292 at the branch point 122, and to the local electricity generator 200. The local electricity generator 200 generates electricity using the flow of the second portion of the fluid, as described above.

The second portion of the fluid exits the local electricity generator 200, and flows through the output flowline 294 to the branch point 126 at the multistage choke 176. The second portion of the fluid commingles with the first portion of the fluid at the branch point 126 between the first choke stage 176A and the second choke stage 176B. The commingled fluid flows through the second choke stage 176B to the tree 160. The commingled fluid flows through the wing valve 166 and the master valve 162, and into the tubing string 154. The commingled fluid flows through the tubing string 154 and into the subterranean formation.

In some embodiments, the second choke stage 176B of the multistage choke 176 is configured to function as the choke 244 in one or more generator units of the local electricity generator 200. In some of such embodiments, the choke 244 is omitted from one or more generator units of the local electricity generator 200. In some embodiments, the choke 242 is omitted from one or more generator units of the local electricity generator 200.

In some embodiments, the second choke stage 176B is operated such that the pressure within the multistage choke 176 is maintained above a cavitation threshold pressure. In some embodiments, the second choke stage 176B is operated such that the pressure within the choke 244 is maintained above a cavitation threshold pressure. In some embodiments, the second choke stage 176B is operated such that the pressure within the choke 242 is maintained above a cavitation threshold pressure.

In some embodiments, the local electricity generator 200 generates electricity continually while the fluid flows into the well 150. In some embodiments, the generation of electricity by the local electricity generator 200 is ceased while the fluid flows into the well 150. In an example, the flow of fluid through the local electricity generator 200 is ceased by closing the valve 124 or the valve 128. In some embodiments, the generation of electricity by the local electricity generator 200 is recommenced, such as by reopening the valve (valve 124 or valve 128) that had been closed.

In some embodiments, the flow of fluid through the local electricity generator 200 is ceased in response to one or more batteries 182 of the battery pack 180 (FIG. 2) being charged up to, or beyond, a selected threshold level, such as 90%, 95%, 97%, 98%, 99%, or 100%. In some embodiments, the flow of fluid through the local electricity generator 200 is recommenced in response to the charge of one or more batteries 182 of the battery pack 180 falling to, or beyond, a selected threshold level, such as 95%, 90%, 85%, 80%, 75%, 70%, 65%, 60%, 55%, 50%, or less.

In some embodiments, in one or more generator units of the local electricity generator 200, the generator 240 is temporarily disconnected from the turbine 230 (FIGS. 3A, 3B) such as described above. In some embodiments, the generator 240 may be temporarily disconnected from one or more batteries 182 of the battery pack 180, such as described above.

Figure 5G:
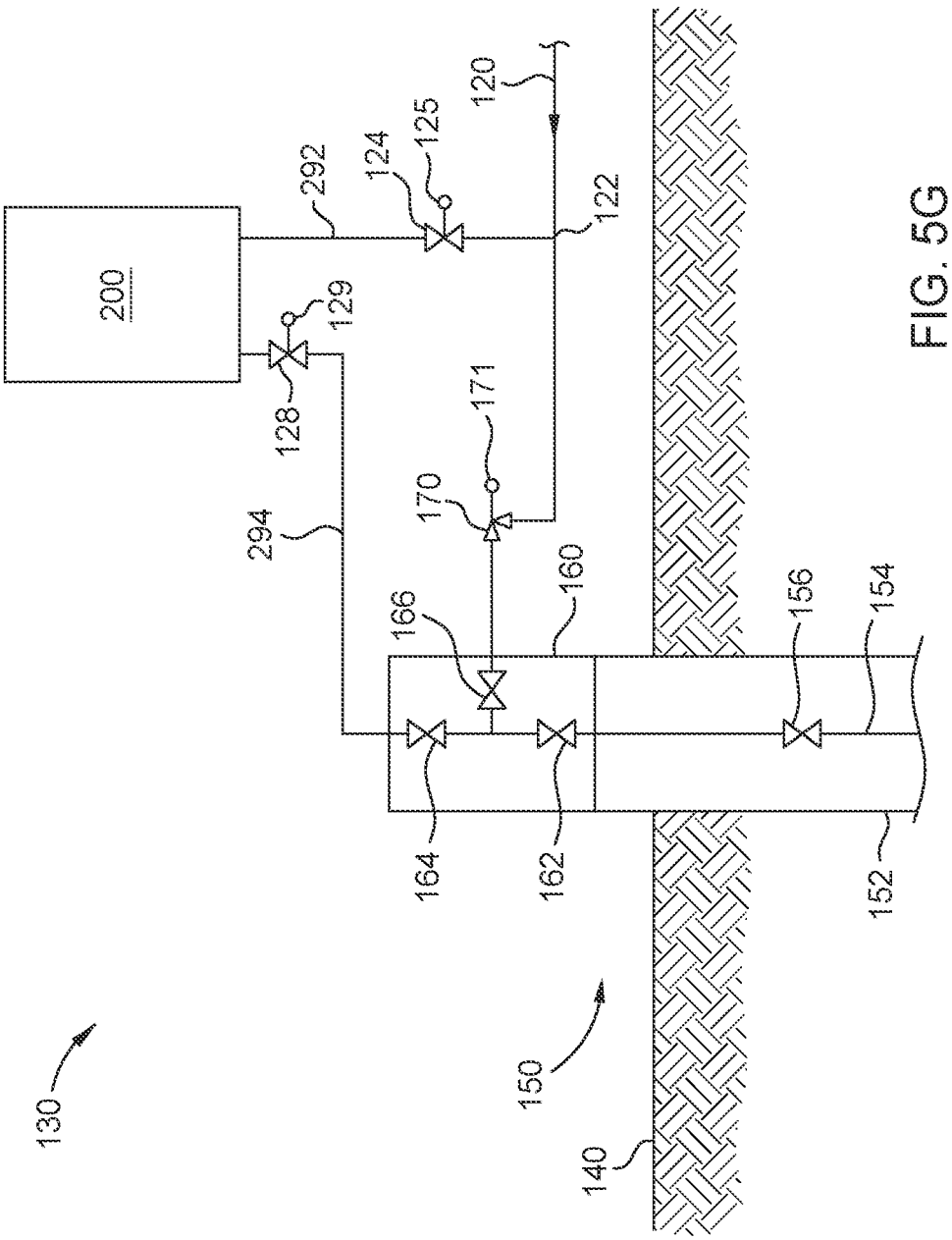

In FIG. 5G, the local electricity generator 200 is disposed in a bypass of the injection flowline 120. The injection flowline 120 is coupled to the tree 160 of the well 150 upstream of the wing valve 166. The injection choke 170 is coupled to the injection flowline 120 upstream of the tree 160. In some embodiments, the injection choke 170 is directly coupled to the tree 160. In some embodiments, the injection choke 170 is not directly coupled to the tree 160.

The input flowline 292 of the local electricity generator 200 is coupled to the injection flowline 120 (such as by a tee joint) at the branch point 122 upstream of the injection choke 170. The input flowline 292 includes the valve 124, as described above. The output flowline 294 of the local electricity generator 200 is coupled to the tree 160 upstream of the swab valve 164. As illustrated, in some embodiments, the output flowline 294 includes the valve 128, as described above. In some embodiments, the valve 128 may be omitted.

At least a first portion of the fluid in the injection flowline 120 flows along the injection flowline 120, and through the injection choke 170 to the tree 160 of the well 150. The first portion of the fluid flows through the wing valve 166. When the valve 124 and the valve 128 (if present) are open, a second portion of the fluid in the injection flowline 120 flows into the input flowline 292 at the branch point 122, and to the local electricity generator 200. The local electricity generator 200 generates electricity using the flow of the second portion of the fluid, as described above.

The second portion of the fluid exits the local electricity generator 200 and flows through the output flowline 294 to the tree 160. The second portion of the fluid flows through the swab valve 164 and commingles with the first portion of the fluid in the tree 160. The commingled fluid flows through the master valve 162, and into the tubing string 154. The commingled fluid flows through the tubing string 154 and into the subterranean formation.

In some embodiments, the local electricity generator 200 generates electricity continually while the fluid flows into the well 150. In some embodiments, the generation of electricity by the local electricity generator 200 is ceased while the fluid flows into the well 150. In an example, the flow of fluid through the local electricity generator 200 is ceased by closing the valve 124, the valve 128, or the swab valve 164. In some embodiments, the generation of electricity by the local electricity generator 200 is recommenced, such as by reopening the valve (valve 124, valve 128, or swab valve 164) that had been closed.

In some embodiments, the flow of fluid through the local electricity generator 200 is ceased in response to one or more batteries 182 of the battery pack 180 (FIG. 2) being charged up to, or beyond, a selected threshold level, such as 90%, 95%, 97%, 98%, 99%, or 100%. In some embodiments, the flow of fluid through the local electricity generator 200 is recommenced in response to the charge of one or more batteries 182 of the battery pack 180 falling to, or beyond, a selected threshold level, such as 95%, 90%, 85%, 80%, 75%, 70%, 65%, 60%, 55%, 50%, or less.

In some embodiments, in one or more generator units of the local electricity generator 200, the generator 240 is temporarily disconnected from the turbine 230 (FIGS. 3A, 3B) such as described above. In some embodiments, the generator 240 may be temporarily disconnected from one or more batteries 182 of the battery pack 180, such as described above.

Figure 6:
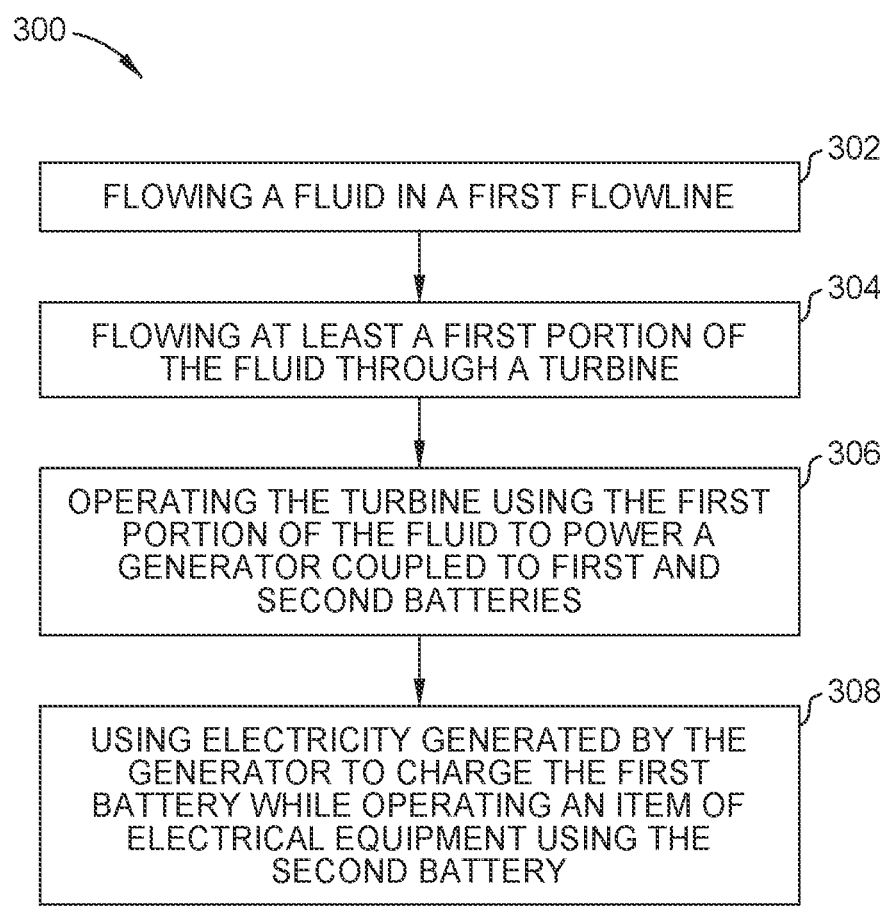
FIG. 6 is a flowchart of a method of generating electrical power at a wellsite.

FIG. 6 is a flowchart of a method 300 of generating electrical power. In some embodiments, the method 300 is performed at a manifold, such as distribution manifold 106. In some embodiments, the method 300 is performed at a wellsite, such as wellsite 130. The method 300 may be performed using any of the embodiments of the present disclosure. The method 300 may include any of the processes or activities of the present disclosure.

Operation 302 includes flowing a fluid in a first flowline. In some embodiments, the fluid flows in the first flowline to a manifold, such as distribution manifold 106. In some embodiments, the fluid flows in the first flowline to a well at a wellsite, such as wellsite 130. In some embodiments, the well is a production well. In some embodiments, the well is an injection well. In some embodiments, the well is well 150. In some embodiments, the fluid is, or includes, a pressurized fluid that is injected into the well for placement in a subterranean formation. In some embodiments, the pressurized fluid is, or includes, at least one of water, a hydrocarbon, or carbon dioxide. In some embodiments, the pressurized fluid is, or includes, a treatment fluid that is injected into the well. In some embodiments, the treatment fluid is, or includes, water, a corrosion inhibitor, a hydrate inhibitor (such as a glycol), a wax inhibitor, a sulfide scavenger, or the like. In some embodiments, the treatment fluid is injected into an annulus surrounding a tubing string in the well.

Operation 304 includes flowing at least a first portion of the fluid through a turbine, such as turbine 230. In some embodiments, the turbine is part of a generator unit (such as generator unit 210) of a local electricity generator (such as local electricity generator 200). In some embodiments, the local electricity generator is located at the manifold. In some embodiments, the local electricity generator is located at the wellsite. In some embodiments, the local electricity generator may be configured as any one or more of the local electricity generators 200A, 200B, 200C, or 200D.

In some embodiments, a second flowline forms a branch off the first flowline, and operation 304 includes flowing the first portion of the fluid through the second flowline to the turbine. In some embodiments, the method 300 includes flowing a second portion of the fluid through the first flowline bypassing the turbine. In some embodiments, the method 300 includes recombining the first portion of the fluid with the second portion of the fluid upstream of the well. In some embodiments, the method 300 includes recombining the first portion of the fluid with the second portion of the fluid at the well.

Operation 306 includes operating the turbine using the first portion of the fluid to power a generator, such as generator 240, coupled to first and second batteries, such as batteries 182. The generator is coupled to the turbine. The generator generates electricity. In some embodiments, the generator is an alternator.

Operation 308 includes using the electricity generated by the generator to charge the first battery while operating an item of electrical equipment using a second battery. In some embodiments, a battery pack (such as battery pack 180) at the location of the generator includes the first battery. In some embodiments, the battery pack includes the first battery and the second battery. In some embodiments, the electricity generated by the generator is used to charge the first battery in response to the charge of the first battery falling to, or beyond, a selected threshold level, such as 95%, 90%, 85%, 80%, 75%, 70%, 65%, 60%, 55%, 50%, or less. In some embodiments, the charging of the first battery is ceased in response to the first battery being charged up to, or beyond, a selected threshold level, such as 90%, 95%, 97%, 98%, 99%, or 100%. In some embodiments, the charging of the first battery is ceased by performing any of the cessation activities described above, such as disconnecting the generator from the turbine or disconnecting the generator from the first battery. In some embodiments, the electricity generated by the generator is used to apply a trickle charge to the first battery.

In some embodiments, the item of electrical equipment includes one or more of a valve, a controller (such as local controller 190), a sensor, or a telemetry system. In some examples, the valve includes a choke (such as injection choke 170, second injection choke 174, multistage choke 176, choke 242, or choke 244), a valve of the local electricity generator, a valve associated with the input flowline 292 (such as valve 124), a valve associated with the output flowline 294 (such as valve 128), a valve of a tree of the well (such as master valve 162, swab valve 164, or wing valve 166), or a valve disposed in the well (such as the subsurface safety valve 156). In some examples, the telemetry system includes an electric line, a fiber optic line, a radio telemetry transceiver, or an acoustic telemetry transceiver.

In some embodiments, the method 300 includes using electricity generated by the generator to charge the second battery. In some embodiments, the method 300 includes using electricity generated by the generator to charge the second battery while operating the item of electrical equipment using the second battery. In some embodiments, the method 300 includes using electricity generated by the generator to charge the second battery while operating the item of electrical equipment using the first battery. In some embodiments, the electricity generated by the generator is used to apply a trickle charge to the second battery.

In some embodiments, the fluid is, or includes, water, a hydrocarbon, or carbon dioxide. In some embodiments, the first portion of the fluid is in a supercritical state upstream of the turbine. In some embodiments, the method 300 includes maintaining the first portion of the fluid in a supercritical state while flowing the first portion of the fluid through the turbine. In some embodiments, the method 300 includes transitioning the first portion of the fluid from the supercritical state to a gas phase or a liquid phase. In some embodiments, the transitioning of the first portion of the fluid from the supercritical state to a gas phase or a liquid phase occurs while flowing the first portion of the fluid through the turbine. In some embodiments, the transitioning of the first portion of the fluid from the supercritical state to a gas phase or a liquid phase occurs before flowing the first portion of the fluid through the turbine. In an example, the transitioning of the first portion of the fluid from the supercritical state to a gas phase or a liquid phase occurs at a choke, such as choke 242, upstream of an inlet of the turbine. In some embodiments, the transitioning of the first portion of the fluid from the supercritical state to a gas phase or a liquid phase occurs after flowing the first portion of the fluid through the turbine. In an example, the transitioning of the first portion of the fluid from the supercritical state to a gas phase or a liquid phase occurs at a choke, such as choke 244, downstream of an outlet of the turbine.

Embodiments of the present disclosure provide systems, apparatus, and methods for generating electricity using a flow of a fluid and are useful for providing electrical power at remote locations. The fluid can include water, a hydrocarbon, or carbon dioxide. The fluid can be injected into a well at a wellsite. Electrical equipment at the wellsite, such as a valve, a sensor, or a telemetry system, is powered by a battery that is charged by the electrical power generated using the flow of the fluid that is injected into the well.

Example Aspects

Implementation examples are described in the following numbered aspects:

Aspect 1: A system for generating electrical power, the system comprising: a generator unit including: a base, and a power generation module removably coupled to the base and including a generator coupled to a turbine; a first flowline coupled to the generator unit and configured to convey a fluid to an inlet of the turbine; and a second flowline coupled to the generator unit and configured to convey the fluid from an outlet of the turbine.

Aspect 2: The system of Aspect 1, wherein the second flowline is coupled to a third flowline, a manifold, or a tree of a well.

Aspect 3: The system of any combination of Aspects 1-2, wherein the first flowline is a first branch off a third flowline from a first branch point of the third flowline; and the third flowline is coupled to a tree of a well upstream of a wing valve of the tree.

Aspect 4: The system of any combination of Aspects 2-3, wherein the second flowline is coupled to the tree upstream of a swab valve of the tree.

Aspect 5: The system of Aspect 3, wherein the second flowline is a second branch off the third flowline from a second branch point of the third flowline downstream of the first branch point.

Aspect 6: The system of Aspect 5, further comprising a choke coupled to the third flowline between the first branch point and the second branch point.

Aspect 7: The system of any combination of Aspects 5-6, wherein the second branch point of the third flowline is at a multistage choke coupled to the third flowline.

Aspect 8: The system of Aspect 7, wherein the second branch point of the third flowline is between first and second stages of the multistage choke.

Aspect 9: The system of any combination of Aspects 1-8, further comprising a converter coupled to the generator, the converter configured to convert a three-phase AC power generated by the generator into a DC power.

Aspect 10: A system for generating electrical power, comprising: a first base including first and second conduits; a first power generation module coupled to the first base, the first power generation module including a first turbine coupled to a first generator, wherein: the first conduit is coupled to an inlet of the turbine, and the second conduit is coupled to an outlet of the turbine; and a choke coupled to the inlet or the outlet.

Aspect 11: The system of Aspect 10, wherein the choke is disposed in the first power generation module.

Aspect 12: The system of any combination of Aspects 10-11, further comprising a second power generation module including a second turbine coupled to a second generator, wherein: the second power generation module is coupled to the first base; and the second power generation module is fluidically coupled to the first power generation module via the first base in a series arrangement or a parallel arrangement.

Aspect 13: The system of any combination of Aspects 10-11, further comprising a second power generation module including a second turbine coupled to a second generator, wherein: the second power generation module is coupled to a second base; and the second base is fluidically coupled to the first base in a series arrangement or a parallel arrangement.

Aspect 14: A method of generating electrical power, comprising: flowing a fluid in a first flowline; flowing at least a first portion of the fluid through a turbine; operating the turbine using the first portion of the fluid to power a generator coupled to first and second batteries; and using electricity generated by the generator to charge the first battery while operating an item of electrical equipment using the second battery.

Aspect 15: The method of Aspect 14, further comprising using electricity generated by the generator to charge the second battery while operating the item of electrical equipment using the first battery.

Aspect 16: The method of any combination of Aspects 14-15, further comprising flowing the fluid to a well.

Aspect 17: The method of any combination of Aspects 14-16, further comprising: flowing the first portion of the fluid through a second flowline to the turbine, the second flowline forming a branch off the first flowline; and flowing a second portion of the fluid through the first flowline, bypassing the turbine.

Aspect 18: The method of Aspect 17, further comprising recombining the first portion of the fluid with the second portion of the fluid downstream of the turbine.

Aspect 19: The method of any combination of Aspects 14-18, wherein the item of electrical equipment includes one or more of a valve, a controller, a sensor, or a telemetry system.

Aspect 20: The method of Aspect 19, wherein the valve includes a choke, a valve of a tree of a well, or a valve disposed in the well.

It is contemplated that any one or more elements or features of any one disclosed embodiment or example may be beneficially incorporated in any one or more other non-mutually exclusive embodiments or examples. While the foregoing is directed to embodiments of the present disclosure, other and further embodiments of the disclosure may be devised without departing from the basic scope thereof, and the scope thereof is determined by the claims that follow.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system for generating electrical power, the system comprising:
    a generator unit including:
    a first base;
    a power generation module removably coupled to the first base and including a generator coupled to a turbine; and
    a dummy module removably coupled to a second base in series with the first base, the dummy module including a conduit having first and second ends fluidically coupled to the second base;
    a first flowline coupled to the generator unit and configured to convey a fluid to an inlet of the turbine; and
    a second flowline coupled to the generator unit and configured to convey the fluid from an outlet of the turbine;
    wherein the fluid is routed from the first flowline to the power generation module and the dummy module in series, then to the second flowline; and
    wherein the second flowline is coupled to a tree of a well.

2. The system of claim 1, wherein:
    the first flowline is a first branch off a third flowline from a first branch point of the third flowline; and
    the third flowline is coupled to the tree of the well upstream of a wing valve of the tree.

3. The system of claim 2, wherein the second flowline is coupled to the tree upstream of a swab valve of the tree.

4. The system of claim 2, wherein the second flowline is a second branch off the third flowline from a second branch point of the third flowline downstream of the first branch point.

5. The system of claim 4, further comprising a choke coupled to the third flowline between the first branch point and the second branch point.

6. The system of claim 4, wherein the second branch point of the third flowline is at a multistage choke coupled to the third flowline.

7. The system of claim 6, wherein the second branch point of the third flowline is between first and second stages of the multistage choke.

8. The system of claim 1, further comprising a converter coupled to the generator, the converter configured to convert a three-phase AC power generated by the generator into a DC power.

9. The system of claim 1, wherein:
    the fluid is routed through the power generation module and then the dummy module; or
    the fluid is routed through the dummy module and then the power generation module.

10. A system for generating electrical power, comprising:
    a base including first and second conduits;
    a first power generation module coupled to the base, the first power generation module including a first turbine coupled to a first generator; and
    a dummy module removably coupled to the base and in series with the first power generation module, the dummy module including a third conduit having first and second ends fluidically coupled to the base;
    wherein fluid is routed through the first conduit, then through the first power generation module and the dummy module in series, then through the second conduit; and
    wherein the second conduit is coupled to a tree of a well.

11. The system of claim 10, wherein:
    the fluid is routed through the first power generation module and then the dummy module; or the fluid is routed through the dummy module and then the first power generation module.

12. The system of claim 10, further comprising a second power generation module coupled to the base in series with the first power generation module and the dummy module, the second power generation module including a second turbine coupled to a second generator.

13. A method of generating electrical power, comprising:
flowing at least a first portion of a fluid in a first flowline to a generator unit, the generator unit including:
a base including first and second conduits;
a power generation module coupled to the base, and including a generator coupled to a turbine and coupled to first and second batteries; and
a dummy module removably coupled to the base and in series with the power generation module, the dummy module including a third conduit having first and second ends fluidically coupled to the base;
wherein the first portion of the fluid is routed through the first conduit then through the power generation module and the dummy module in series, then through the second conduit;
flowing at least the first portion of the fluid through the turbine;
operating the turbine using the first portion of the fluid to power the generator;
using electricity generated by the generator to charge the first battery while operating an item of electrical equipment using the second battery; and
flowing the fluid to a tree of a well.

14. The method of claim 13, further comprising using electricity generated by the generator to charge the second battery while operating the item of electrical equipment using the first battery.

15. The method of claim 13, further comprising:
flowing the first portion of the fluid through a second flowline to the turbine, the second flowline forming a branch off the first flowline; and
flowing a second portion of the fluid through the first flowline, bypassing the turbine.

16. The method of claim 15, further comprising recombining the first portion of the fluid with the second portion of the fluid downstream of the turbine.

17. The method of claim 13, wherein the item of electrical equipment includes at least one of a valve, a controller, a sensor, or a telemetry system.

18. The method of claim 17, wherein the valve includes a choke, a valve of the tree of the well, or a valve disposed in the well.

* * * * *